United States Patent [19]
Kondo

[11] Patent Number: 5,327,579
[45] Date of Patent: Jul. 5, 1994

[54] SCANNING SYSTEMS USING TREE STRUCTURES

[75] Inventor: Tosio Kondo, Yokosuka, Japan

[73] Assignee: Nippon Telegraph and Telephone Corporation, Tokyo, Japan

[21] Appl. No.: 153,276

[22] Filed: Nov. 16, 1993

Related U.S. Application Data

[63] Continuation of Ser. No. 786,501, Nov. 1, 1991, abandoned.

[30] Foreign Application Priority Data

Nov. 6, 1990 [JP] Japan ................... 2-300168

[51] Int. Cl.⁵ .................... G06F 7/00; G06F 15/16
[52] U.S. Cl. ................ 395/800; 364/DIG. 1; 364/251.6; 364/229.41
[58] Field of Search .......................... 395/800

[56] References Cited

FOREIGN PATENT DOCUMENTS 63-193232 8/1988 Japan .
1-300337 12/1989 Japan .

OTHER PUBLICATIONS

IRE Transactions on Electronics Computers, vol. EC-11, Jun., pp. 340-345 (1962).
International Conference on Parallel Processing, pp. 355-362, Aug. (1987).

Primary Examiner—Lawrence E. Anderson
Attorney, Agent, or Firm—Frishauf, Holtz, Goodman & Woodward

[57] ABSTRACT

A scanning system using tree structures is constituted by a propagation operating unit array having a tree structure in which propagation units are formed into groups on each layer, and each group of the propagation operating units is connected to a propagation operating unit belonging to the higher adjacent layer, and an interface element array connected to the propagation operating units of the lowermost layer. Each of the propagation operating units is constituted by a plurality of cascaded propagation elements. Each propagation element includes first and second selectors for selecting input signals $DA_i$ and $DB_i$ from the lower adjacent layer in accordance with two propagation signals from the immediately forwarding propagation element and a third selector for selecting two propagation signals from an adjacent propagation element in accordance with an input signal U from the upper adjacent layer. The interface element includes an ALU for performing scan operating with respect to a data array consisting of part of an input scan target data array and "0", and a data array consisting of the part of the input scan target data array and "1". The interface element supplies outputs from the ALU as $DA_i$ and $DB_i$, to the propagation operating unit of the lowermost layer of the tree-like propagation operating unit array.

8 Claims, 27 Drawing Sheets

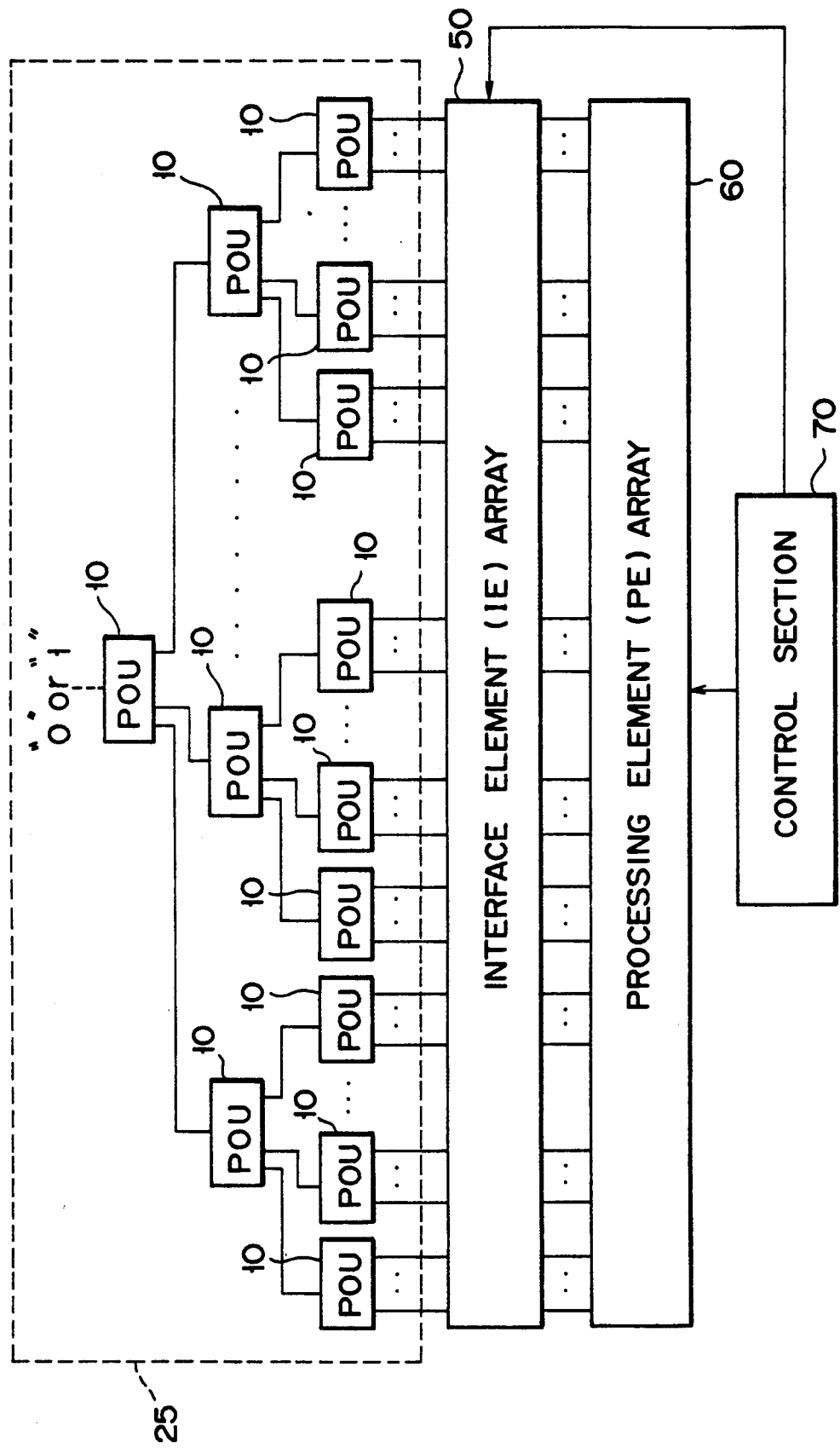
F I G. 5

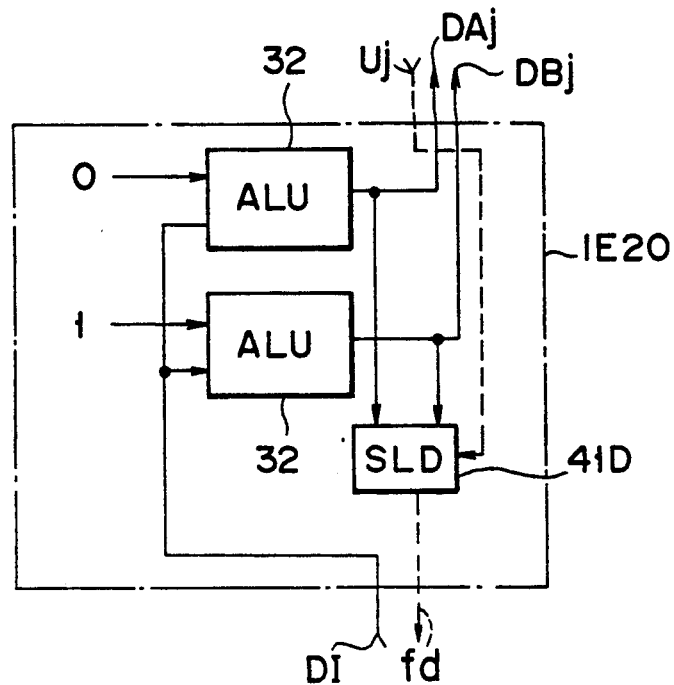
F I G. 7A
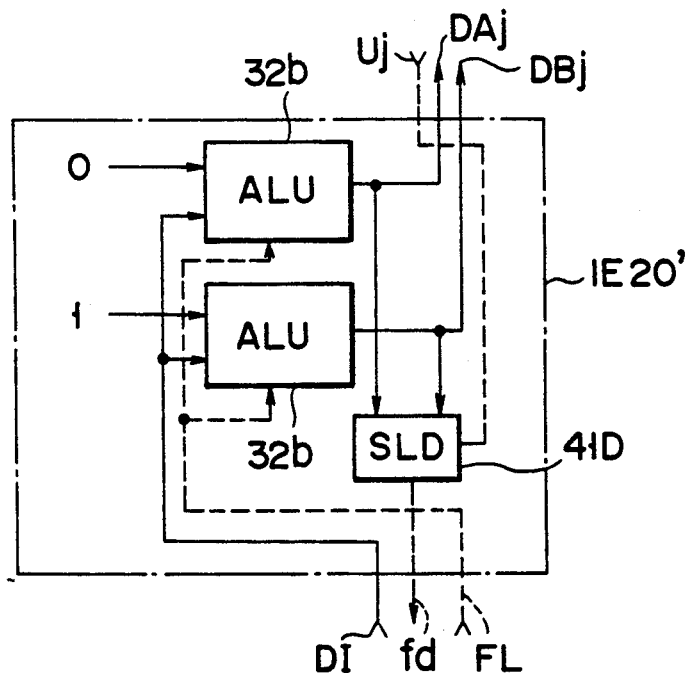
F I G. 7B

UP SWEEP

| | IE NAME | IE1 | IE2 | IE3 | IE4 | IE5 | IE6 | IE7 | IE8 |
|---|---|---|---|---|---|---|---|---|---|
| IE INPUT/OUTPUT SIGNAL | DI | 0 | 0 | - | 0 | - | 0 | - | - |
| | DA | 0 | 0 | - | 0 | - | 0 | - | - |
| | DB | - | - | - | - | - | - | - | - |
| FIRST LAYER POU OUTPUT | POU NAME | POU1 | | POU2 | | POU3 | | POU4 | |
| | DA | 0 | | - | | - | | - | |
| | DB | - | | - | | - | | - | |
| SECOND LAYER POU OUTPUT | POU NAME | POU5 | | | | POU6 | | | |
| | DA | - | | | | - | | | |
| | DB | - | | | | - | | | |

FIG. 11A

DOWN SWEEP

| | POU NAME | | | | | | | | |
|---|---|---|---|---|---|---|---|---|---|
| THIRD LAYER POU INPUT/OUTPUT | U(INPUT) | POU7 | | | | | | | |
| | U(OUTPUT) | 0 | | | | | | | |
| SECOND LAYER POU OUTPUT | POU NAME | POU5 | | | POU6 | | | | |
| | U | 0 | | | 1 | | | | |
| FIRST LAYER POU OUTPUT | POU NAME | POU1 | POU2 | | POU3 | | POU4 | | |
| | U | 0 | 0 | 1 | 1 | 1 | 1 | | |
| IE INPUT/OUTPUT | IE NAME | IE1 | IE2 | IE3 | IE4 | IE5 | IE6 | IE7 | IE8 |
| | fd | 0 | 0 | 1 | 1 | 1 | 1 | 1 | 1 |

FIG. 11B

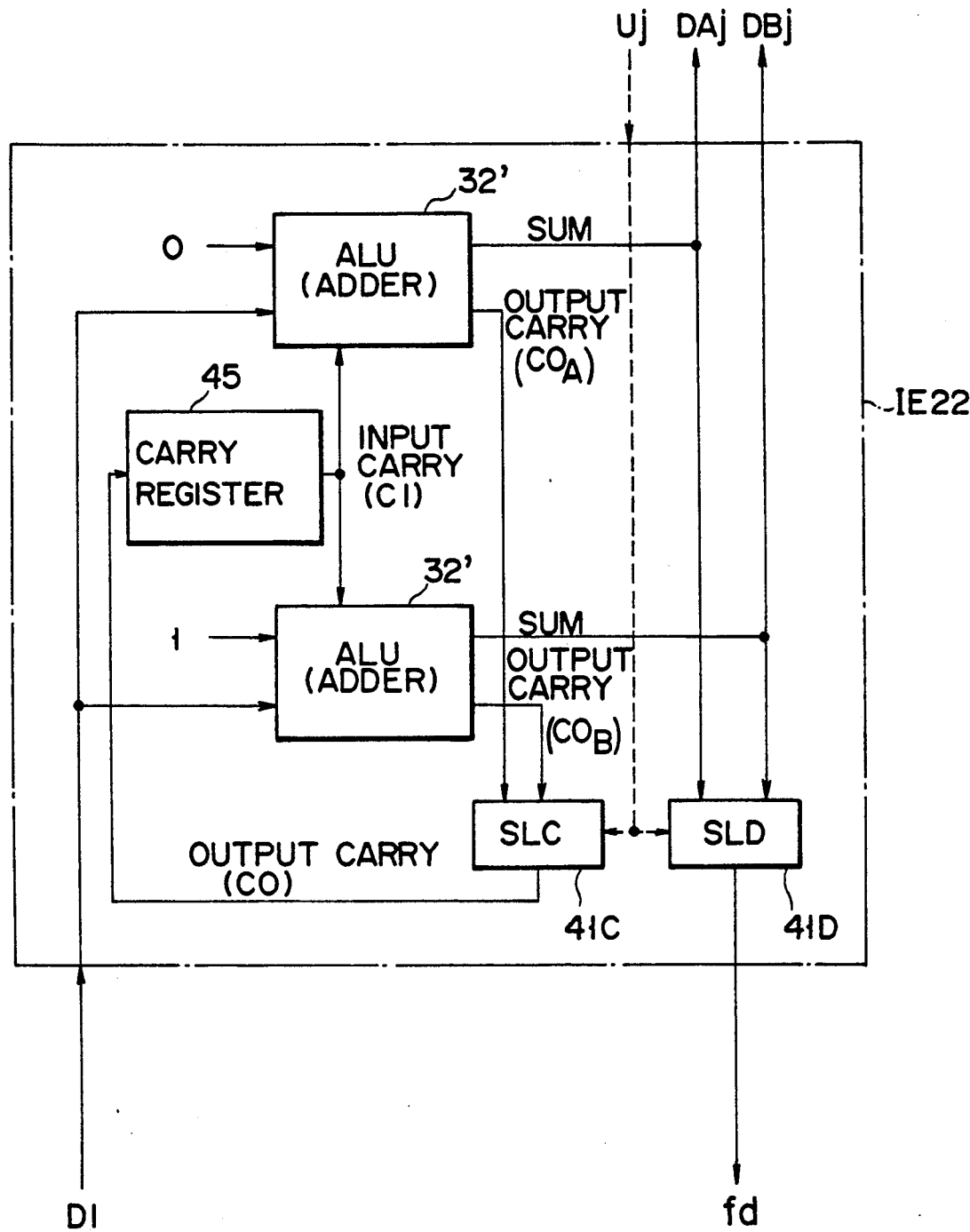
F I G. 12

UP SWEEP FOR FIRST DIGIT (LSD)

| | IE NAME | IE1 | IE2 | IE3 | IE4 | IE5 | IE6 | IE7 | IE8 |
|---|---|---|---|---|---|---|---|---|---|
| IE INPUT/OUTPUT SIGNAL | DI | 1 | 1 | 1 | 1 | 1 | 1 | 1 | 1 |
| | CI | 0 | 0 | 0 | 0 | 0 | 0 | 0 | 0 |
| | DA | 1 | 1 | 1 | 1 | 1 | 1 | 1 | 1 |
| | DB | 0 | 0 | 0 | 1 | 0 | 0 | 0 | 0 |
| | $CO_A$ | 0 | 0 | 0 | 0 | 0 | 0 | 0 | 0 |
| | $CO_B$ | 1 | 1 | 1 | 1 | 1 | 1 | 1 | 1 |

| | POU NAME | POU1 | POU2 | POU3 | POU4 |
|---|---|---|---|---|---|
| FIRST LAYER POU OUTPUT | DA | 0 | 1 | 1 | 0 |
| | DB | 1 | 0 | 0 | 1 |

| | POU NAME | POU5 | POU6 |
|---|---|---|---|
| SECOND LAYER POU OUTPUT | DA | 0 | 1 |
| | DB | 1 | 0 |

FIG. 13AI

DOWN SWEEP FOR FIRST DIGIT (LSD)

| | POU NAME | | | | | | | | |
|---|---|---|---|---|---|---|---|---|---|
| THIRD LAYER POU INPUT/OUTPUT | U(INPUT) | | | | POU7 | | | | |
| | U(OUTPUT) | | | | 0 | | | | |
| | POU NAME | | POU5 | | | | POU6 | | |
| SECOND LAYER POU OUTPUT | U | 0 | | 0 | | 0 | | 1 | |
| | POU NAME | POU1 | | POU2 | | POU3 | | POU4 | |
| FIRST LAYER POU OUTPUT | U | 0 | 1 | 0 | 0 | 0 | 0 | 1 | 0 |
| | IE NAME | IE1 | IE2 | IE3 | IE4 | IE5 | IE6 | IE7 | IE8 |
| IE INPUT/OUTPUT | fd | 1 | 0 | 1 | 0 | 0 | 1 | 0 | 1 |
| | co | 0 | 1 | 0 | 0 | 0 | 0 | 1 | 0 |

FIG. 13AII

UP SWEEP FOR SECOND DIGIT

| | IE NAME | IE1 | IE2 | IE3 | IE4 | IE5 | IE6 | IE7 | IE8 |
|---|---|---|---|---|---|---|---|---|---|
| IE INPUT/OUTPUT SIGNAL | DI | 1 | 0 | 1 | 0 | 0 | 0 | 0 | 1 |
| | CI | 0 | 1 | 0 | 0 | 0 | 0 | 1 | 0 |
| | DA | 1 | 1 | 1 | 0 | 0 | 0 | 1 | 1 |
| | DB | 0 | 0 | 0 | 1 | 1 | 1 | 0 | 0 |
| | CO$_A$ | 0 | 0 | 0 | 0 | 0 | 0 | 0 | 0 |
| | CO$_B$ | 1 | 1 | 1 | 0 | 0 | 0 | 1 | 1 |

| | POU NAME | POU1 | POU2 | POU3 | POU4 |
|---|---|---|---|---|---|
| FIRST LAYER POU OUTPUT | DA | 0 | 1 | 0 | 0 |
| | DB | 1 | 0 | 1 | 1 |

| | POU NAME | POU5 | POU6 |
|---|---|---|---|
| SECOND LAYER POU OUTPUT | DA | 1 | 0 |
| | DB | 0 | 1 |

F I G. 13BI

DOWN SWEEP FOR SECOND DIGIT

| | POU NAME | | | | POU7 | | | | |
|---|---|---|---|---|---|---|---|---|---|
| THIRD LAYER POU INPUT/OUTPUT | U(INPUT) | | | | 0 | | | | |
| | U(OUTPUT) | | | | 0 | | | | |
| | POU NAME | | POU5 | | | | POU6 | | |
| SECOND LAYER POU OUTPUT | U | | 0 | | 0 | | 1 | | |
| | POU NAME | POU1 | | POU2 | | POU3 | | POU4 | |
| FIRST LAYER POU OUTPUT | U | 0 | 1 | 0 | 1 | 0 | 1 | 0 | 1 |
| | IE NAME | IE1 | IE2 | IE3 | IE4 | IE5 | IE6 | IE7 | IE8 |
| IE INPUT/OUTPUT | fd | 1 | 0 | 1 | 1 | 1 | 1 | 0 | 1 |
| | co | 0 | 1 | 0 | 0 | 0 | 0 | 1 | 0 |

F I G. 13BII

UP SWEEP FOR THIRD DIGIT

| | IE NAME | IE1 | IE2 | IE3 | IE4 | IE5 | IE6 | IE7 | IE8 |
|---|---|---|---|---|---|---|---|---|---|
| IE INPUT/OUTPUT SIGNAL | DI | 0 | 0 | 0 | 0 | 1 | 0 | 0 | 0 |
| | CI | 0 | 1 | 0 | 0 | 0 | 0 | 1 | 0 |
| | DA | 0 | 1 | 0 | 0 | 1 | 0 | 1 | 0 |
| | DB | 1 | 0 | 1 | 1 | 0 | 1 | 0 | 1 |
| | $CO_A$ | 0 | 0 | 0 | 0 | 0 | 0 | 0 | 0 |
| | $CO_B$ | 0 | 1 | 0 | 0 | 1 | 0 | 1 | 0 |

| | POU NAME | POU1 | | POU2 | | POU3 | | POU4 | |
|---|---|---|---|---|---|---|---|---|---|
| FIRST LAYER POU OUTPUT | DA | 1 | | 0 | | 1 | | 1 | |
| | DB | 0 | | 1 | | 0 | | 0 | |

| | POU NAME | POU5 | | | | POU6 | | | |
|---|---|---|---|---|---|---|---|---|---|
| SECOND LAYER POU OUTPUT | DA | 1 | | | | 0 | | | |
| | DB | 0 | | | | 1 | | | |

FIG. 13CI

DOWN SWEEP FOR THIRD DIGIT

| | | | IE1 | IE2 | IE3 | IE4 | IE5 | IE6 | IE7 | IE8 |
|---|---|---|---|---|---|---|---|---|---|---|
| THIRD LAYER POU INPUT/OUTPUT | POU NAME | | POU7 | | | | | | | |
| | U(INPUT) | | 0 | 0 | 0 | 0 | | | | |
| | U(OUTPUT) | | | | | | 1 | 1 | 1 | 1 |
| SECOND LAYER POU OUTPUT | POU NAME | | POU5 | | | | POU6 | | | |
| | U | | 0 | 0 | 0 | 0 | 1 | 1 | 1 | 1 |
| FIRST LAYER POU OUTPUT | POU NAME | | POU1 | | POU2 | | POU3 | | POU4 | |
| | U | | 0 | 0 | 1 | 1 | 1 | 0 | 0 | 1 |
| IE INPUT/OUTPUT | IE NAME | | IE1 | IE2 | IE3 | IE4 | IE5 | IE6 | IE7 | IE8 |
| | | fd | 0 | 1 | 1 | 1 | 0 | 0 | 1 | 1 |
| | | co | 0 | 0 | 0 | 0 | 1 | 0 | 0 | 0 |

FIG. 13CII

UP SWEEP FOR FOURTH DIGIT (MSD)

| IE NAME | IE1 | IE2 | IE3 | IE4 | IE5 | IE6 | IE7 | IE8 |
|---|---|---|---|---|---|---|---|---|
| DI | 0 | 0 | 0 | 0 | 0 | 0 | 0 | 0 |
| CI | 0 | 0 | 0 | 0 | 1 | 0 | 0 | 0 |
| DA | 0 | 0 | 0 | 0 | 1 | 0 | 0 | 0 |
| DB | 1 | 1 | 1 | 1 | 0 | 1 | 1 | 1 |
| $CO_A$ | 0 | 0 | 0 | 0 | 0 | 0 | 0 | 0 |
| $CO_B$ | 0 | 0 | 0 | 0 | 1 | 0 | 0 | 0 |

IE INPUT/OUTPUT SIGNAL

FIRST LAYER POU OUTPUT

| POU NAME | POU1 | POU2 | POU3 | POU4 |
|---|---|---|---|---|
| DA | 0 | 0 | 1 | 0 |
| DB | 1 | 1 | 0 | 1 |

SECOND LAYER POU OUTPUT

| POU NAME | POU5 | POU6 |
|---|---|---|
| DA | 0 | 1 |
| DB | 1 | 0 |

F I G. 13DI

DOWN SWEEP FOR FOURTH DIGIT (MSD)

| | POU NAME | POU7 | | | | | | | |
|---|---|---|---|---|---|---|---|---|---|
| THIRD LAYER POU INPUT/OUTPUT | U(INPUT) | 0 | | | | | | | |
| | U(OUTPUT) | 0 | | | | | | | |
| SECOND LAYER POU OUTPUT | POU NAME | POU5 | | | POU6 | | | | |
| | U | 0 | | | 0 | | | 1 | |
| FIRST LAYER POU OUTPUT | POU NAME | POU1 | POU2 | | POU3 | | POU4 | | |
| | U | 0 | 0 | | 0 | | 1 | | |
| | IE NAME | IE1 | IE2 | IE3 | IE4 | IE5 | IE6 | IE7 | IE8 |
| IE INPUT/OUTPUT | fd | 0 | 0 | 0 | 0 | 1 | 1 | 1 | 1 |
| | co | 0 | 0 | 0 | 0 | 0 | 0 | 0 | 0 |

F I G. 13D II

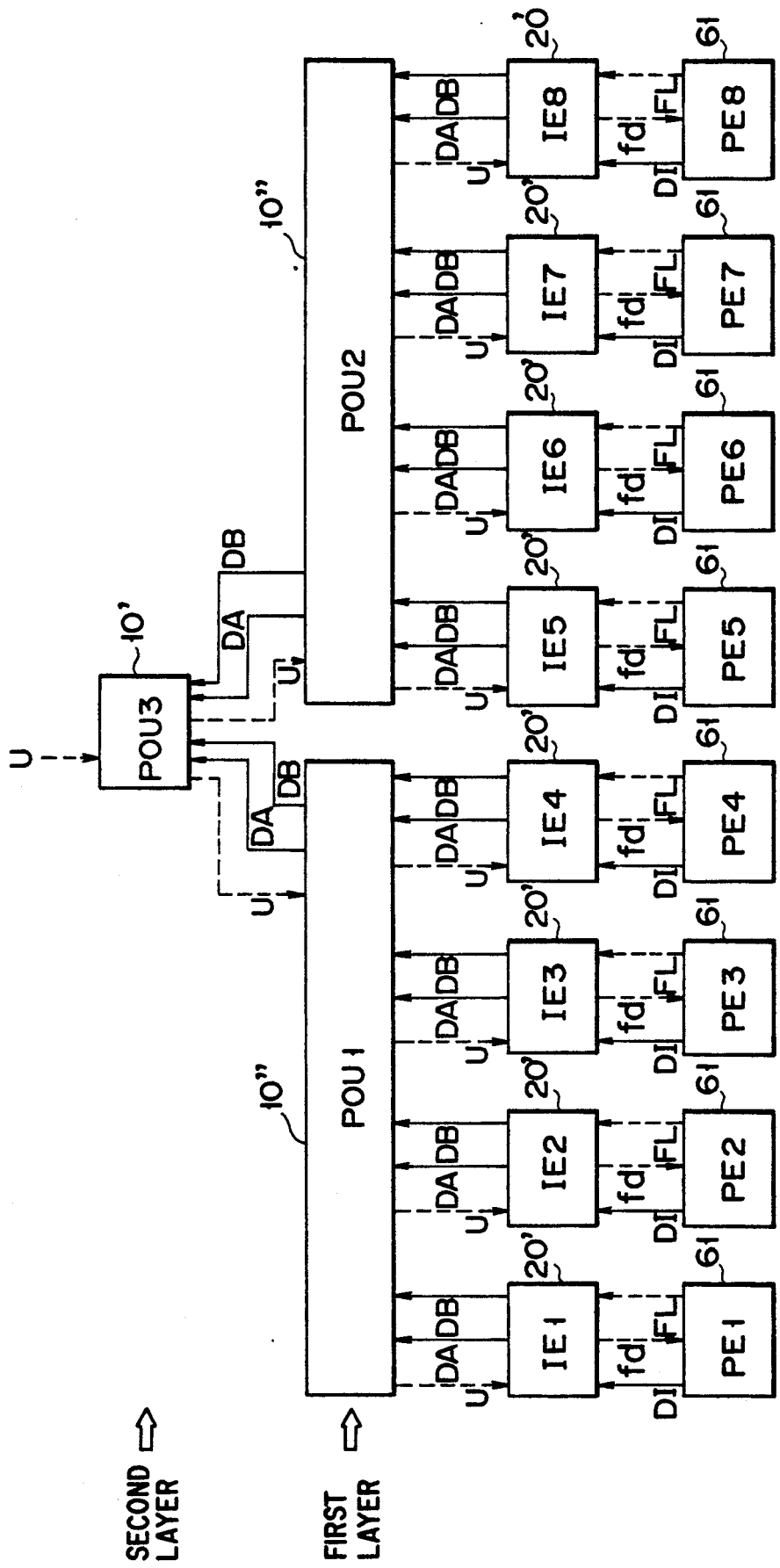
F I G. 14

UP SWEEP

| | IE NAME | IE1 | IE2 | IE3 | IE4 | IE5 | IE6 | IE7 | IE8 |
|---|---|---|---|---|---|---|---|---|---|
| IE INPUT/OUTPUT SIGNAL | DI | 0 | 0 | 1 | 0 | 1 | 0 | 1 | 1 |
| | FL | 1 | 0 | 0 | 0 | 0 | 1 | 0 | 0 |
| | DA | 0 | 0 | 1 | 0 | 1 | 0 | 1 | 1 |
| | DB | 0 | 1 | 1 | 1 | 1 | 0 | 1 | 1 |
| | POU NAME | POU1 | | | | POU2 | | | |
| FIRST LAYER POU OUTPUT | LA,LB NUMBER | 1 | 2 | 3 | 4 | 1 | 2 | 3 | 4 |
| | LA | 0 | 0 | 1 | 1 | 1 | 0 | 1 | 1 |
| | LB | 0 | 0 | 1 | 1 | 1 | 0 | 1 | 1 |
| | DA | | | | | | 1 | | |
| | DB | | | | | | 1 | | |

F I G. 16I

DOWN SWEEP

| | POU NAME | POU3 | | | | | | | |
|---|---|---|---|---|---|---|---|---|---|
| SECOND LAYER INPUT/OUTPUT | U(INPUT) | 0 | | | | | | | |
| | U(OUTPUT) | 1 | | | | | | | |
| | POU NAME | POU1 | | | | POU2 | | | |
| FIRST LAYER POU OUTPUT | U NUMBER | 1 | 2 | 3 | 4 | 1 | 2 | 3 | 4 |
| | U | 0 | 0 | 0 | 1 | 1 | 1 | 0 | 1 |
| | IE NAME | IE1 | IE2 | IE3 | IE4 | IE5 | IE6 | IE7 | IE8 |
| IE INPUT/OUTPUT | fd | 0 | 0 | 1 | 1 | 1 | 0 | 1 | 1 |

F I G. 16 II

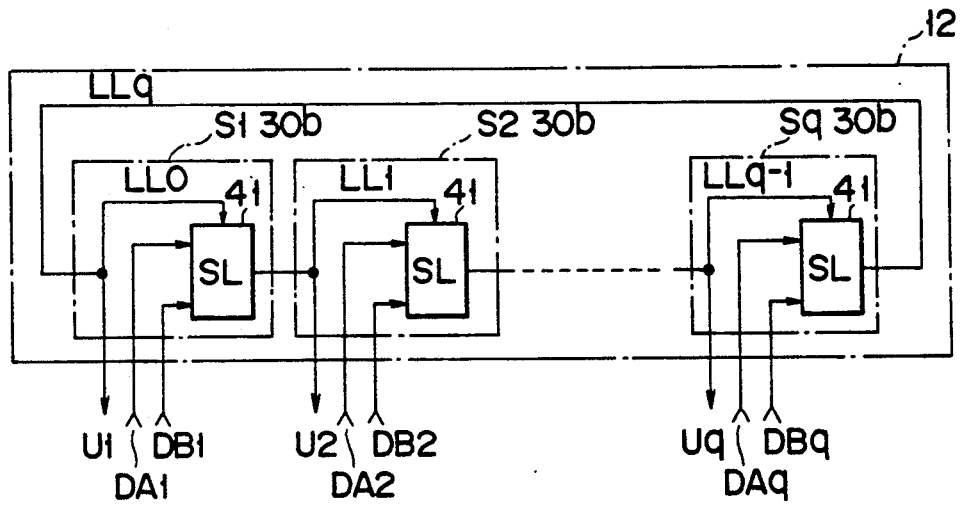
F I G. 19
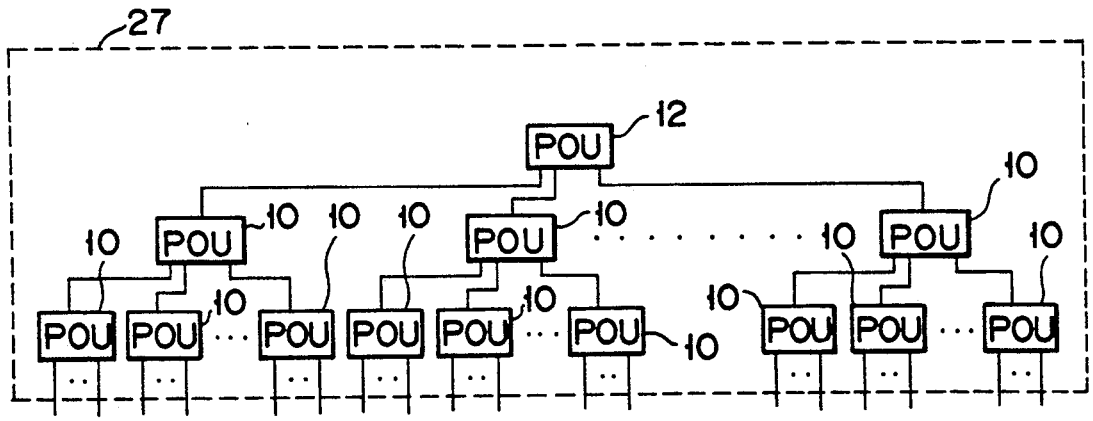
F I G. 20

SCANNING SYSTEMS USING TREE STRUCTURES

This application is a continuation of application Ser. No. 07/786,501, filed Nov. 1, 1991, now abandoned.

BACKGROUND OF THE INVENTION

1. Field of the Invention

The present invention relates to a scanning system using tree structures which is constituted by propagation operating units and designed to execute scan operations (also called associative processing, prefix processing, or propagation processing) for calculating a1, (a1 aM a2), (a1 aM a2 aM a3). . ., and a1 aM a2 aM a3 aM . . . aM (where aM is an operator, called an associative operator, representing "+", "∧", "∨", MIN (for obtaining a minimum value), MAX (for obtaining a maximum value), or the like) with respect to a large-scale data array of a1, a2, a3, . . ., and aM

2. Description of the Related Art

Scan operations are of one type of basic parallel operations. By increasing the speed of these scan operations, the processing time required for various types of operations in a parallel data processing apparatus is shortened.

As a conventional method o#increasing the speed o#scan operations, a method based on processing units arranged in a binary tree structure is known, which is disclosed in, e.g., G. E. Blelloch, "Scans as Primitive Parallel Operations", Proc. Int. Conf. Parallel Process., Aug. 1987, pp. 355-362 (reference 1).

In a scanning system using tree structures according to Blelloch, processing units 1, each constituted by one (or two) arithmetic and logic unit (ALU) and an m-bit memory, are coupled to each other, forming a binary tree structure, as shown in FIG. 1(A) and (B). This system performs two types of processing: 1) sequentially performing scan operations from the lowermost layer to the uppermost layer in such a manner that predetermined associative processing is performed between two inputs supplied from the lower adjacent layer, and the processing result is output to the upper adjacent layer while an input (represented by a numerical value in a box representing a processing unit in FIG. 1(A)), supplied from a processing unit at a lower left position of the lower adjacent layer, is stored in a memory of the corresponding unit (up sweep processing) (FIG. 1(A)); and 2) sequentially performing scan operations from the uppermost layer to the lowermost layer in such a manner that an offset of the processing unit 1 located at a lower right position of the lower adjacent layer is obtained on the basis of the data obtained by the up sweep processing and stored in the memory (down sweep processing) (FIG. 1(B)). In these two types of processing, the scan processing results are output from the respective processing units 1 of the lowermost layer. As is apparent from FIGS. 1(A) and (B), since the number of layers to which the processing units 1 belong is represented by $\log_2 M$, if processing for each layer requires one step, scan operations for the overall array can be executed in $2\log_2 M$ steps required for both up sweep and down sweep. In this case, the offset of each processing unit 1 corresponds to the scan processing result obtained immediately before the scan processing region covered by the processing unit 1. Therefore, the scan processing result at a given point can be obtained by combining a corresponding offset with the local scan processing result of the corresponding processing unit 1.

In this scheme, special ALUs are arranged for up sweep and down sweep, respectively, and registers are arranged between the respective layers to realize pipeline processing, thus equivalently reducing a number of required steps to 1. However, in general processing in which scan operations are not performed repeatedly, steps of a number corresponding to a latency of $2\log_2 M$ of pipeline processing is practically required. This means that even if a number of required steps is extremely reduced as compared with the latency, the contribution of such reduction to high-speed processing is small.

For this reason, in the reference 1, Blelloch proposes a bit pipelining method (sequentially performing scan operations from the least significant digit of a scan target data array in units of bits), wherein a reduction in hardware size can be achieved, although the number of required steps increases in proportion to the word length of the scan target data array. Even this method, for example, has the following problems:

1) When a data array having a short word length, such as image data, is to be processed, the latency cannot be neglected.

2) Although the bit width of each ALU can be reduced to 1 bit, the memory capacity, of each processing unit, required to store an associative processing result cannot be reduced, resulting in an insufficient reduction in hardware size of each processing unit.

As an apparatus which can solve the problems of pipeline processing, a scanning system using tree structures is proposed by the present inventor in "Scanning Apparatus Using Tree Structures Suitable for LSI", the transactions of the Institute of Electronics, Information and Communication Engineers C-II, Vol. J74-C-II, No. 5, pp. 388-397, May 1991. This apparatus executes scan operations with a delay step count of the order of N ($\log_N M$) (capable of reducing a delay time per step to several ns or less and executing scan operations with M of several hundreds in hundred ns or less, i.e., a few clock cycles or less without performing pipeline processing). FIG. 2 shows a parallel data processing apparatus comprising a processing element (PE) array and a scanning system. In the scanning system propagation operating units for executing scan operations of the scheme described in the above literatured of the present inventor are arranged in a tree structure.

In this apparatus, the propagation operating units (POUs) $10a$ are coupled, forming a tree structure, and the respective units are connected to the processing element (PE) array 60.

As shown in FIG. 3, each propagation operating unit $10a$ is constituted by (N−1) cascaded propagation elements $30a$, and has a base-N arrangement for performing scan operations for each local region (a sub array constituted by N cascaded elements of a scan target array) by performing propagation processing between the respective propagation elements $30a$.

Each propagation element $30a$ comprises scan processing ALUs $32a$ and $33a$, an AND gate 31 for propagation start point control, selectors (SELs) 34 and 35, and the like, as is shown in FIG. 4. Referring to FIG. 4, reference symbol $FL_i$ denotes propagation start point attribute data representing a propagation start point at which a scan region is divided into small regions; $DI_i$, scan target data; and $fd_i$, the offset of a scan processing result to be output to a propagation operating unit of the lower adjacent layer. The propagation start attribute data $FL_i$ and the scan processing target data $DI_i$ are input from a propagation operating unit of the lower adjacent layer or a processing element (PE) of the PE array (denoted by reference numeral 60 in FIG. 2).

Referring to FIG. 4, reference symbol $CD_i$ denotes the logical OR of propagation start point attribute data between the propagation elements 30a; and fui denotes an intermediate result of scan operations.

In addition, reference symbol DUI denotes an offset received from the propagation operating unit 10a of the upper adjacent layer.

As is apparent from the tree structure of the propagation operating units 10a and the arrangement of each propagation element 30a, each propagation operating unit 10a of the lowermost layer executes scan operations with respect to scan target data $DI_i$ of a scan processing target data array in a local region covered by each unit through the ALUs 32a and the selectors 34 of the propagation elements 30a. Results $CD_N$ and $fu_N$ are output as start point attribute data $FL_i$ and scan target data $DI_i$ with respect to a corresponding one of the propagation operating units 10a of the second lowest layer. In this case, if the start point attribute point $FL_i$ from the lower adjacent layer represents an active state ("0" in this arrangement, representing that the scan target data $DI_i$ is propagation start point data), the selector 34 is controlled to stop the propagation of the result obtained at the previous stage, and the corresponding propagation element is set as a new start point.

In the second and subsequent stages, $CD_N$ and $fu_N$ are obtained and output as the propagation start point attribute data $FL_i$ and the scan target data $DI_i$ with resect to the propagation operating unit 10a of the upper adjacent layer.

As a result, the scan operating results of the local regions are accumulated in the propagation operating unit 10a of the uppermost layer. In contrast, if "0" is supplied, as the scan target datum DUI, to the uppermost layer, a terminal $fd_i$ outputs an offset to each propagation operating unit 10a of the lower adjacent layer, as is apparent from the arrangement of the propagation element 30a constituted by the ALU 33a, the selector 35, and the AND gate 31. Since each propagation operating unit 10a of the lower adjacent layer calculates and outputs the offset of a corresponding propagation operating unit of the lower adjacent layer on the basis of the received offset, the scan operating result with respect to the data array immediately before the terminal $fd_i$ is obtained, as an offset, at the terminal $fd_i$ of each propagation operating unit of the lowermost layer.

The propagation operating units 10a of layers other than the uppermost layer are designed such that when the propagation start attribute data $FL_i$ is "0", an offset from an upper layer is neglected in the subsequently processing, and scan operations are newly started from a propagation start point.

In this arrangement, since scan operations are performed in tree-like hierarchical layers, the number of propagation elements through which the operating data pass in the scan operations is reduced to about the order of $Nlog_N M$ (where M is the array size of the scan target data array).

The number of propagation elements can be further reduced equivalently by introducing a selective propagation scheme into the propagation processing system of each propagation operating unit 10a. This scheme is disclosed in "Parallel Data Processing Apparatus" of Published Unexamined Japanese Patent Application No. 63-193232 of the present inventor. In the selective propagation scheme, propagation operations are performed for all the combinations of input signal values before an input from the forwarding stage is determined, and propagation is realized by only selecting the forwarding processing results when the input is determined. In the selective propagation scheme applied to each propagation operating unit, however, even if propagation is limited to a 1-bit signal, two combinations of an input are present, and the propagation operating paths corresponding to the number of combinations must be arranged in parallel. Therefore, the number of operating units and selectors required for scan operations is doubled as compared with a case wherein selective propagation is not utilized. In addition, the arrangement of each propagation element is complicated.

As described above, in the conventional scanning system using tree structures, when the size of a scan target data array is large, even if a pipeline structure is formed, the latency in which scan operations are performed through the propagation operating unit of the tree is long. Hence, the scan operating performance corresponding to the degree of parallel processing capability cannot be obtained. Since processing units, memories, pipeline registers, and the like must be incorporated in the respective units constituting a tree, a hardware amount as much as that of a processor section is required. In order to set a scan start point at an arbitrary position (required to perform parallel scan operations in the respective local regions of the array), a start point setting control logic must be incorporated into each propagation operating unit. The above-described problems and the like are still left unsolved.

By the way, a method of performing high-speed addition of two data by using techniques similar to the present invention is disclosed in Published Unexamined Japanese Patent Application No. 1-300337 or "Carry-Select Adder", IRE TRANSACTIONS ON ELECTRON COMPUTERS, June, pp. 340-344, which realizes high-speed processing by selecting previous processing results. The arrangement of this conventional is similar to that of the scanning system of the present invention. However, they are different from each other in the following respects:

1) In order to increase the processing speed and to decrease the hardware size, the conventional apparatus also utilizes the intrinsic characteristics of carry generation. As the result, the conventional apparatus dose not employ a regular tree structure in which each 2-input selector is controlled by an offset value as in the present invention.

2) The present invention is designed for scan operating of each bit of a large number of element data constituting a data array. By contrast, the carry-select adder is basically designed for addition of two data.

With regard to point 1), however, an adder using a tree constituted by only selectors, similar to the present invention, has been proposed, although the symmetry of the tree is slightly low. Since this adder employs a scheme for performing addition by only up sweep processing, even though it is possible to increase the processing speed, various problems are posed, e.g., low regularity of the tree and the necessity of using large sized hardware which is proportional to the square of a word length.

SUMMARY OF THE INVENTION

It is an object of the present invention to provide a scanning system, constituted by propagation operating units arranged in a tree structure and designed to execute scan operations, which can solve the above-described problems, has high scan operating performance, and can effectively reduce the hardware size.

In order to achieve the above object, according to the present invention, there is provided a scanning system using tree structures comprising a propagation operating unit array having a tree structure in which propagation operating units are formed into groups on each layer, and each group is coupled to one propagation operating unit belonging to an upper adjacent layer, each propagation operating unit of the propagation operating unit array having at least one cascaded propagation element, an ith (i=an integer not less than 2) propagation element $E_i$ of the cascaded propagation elements including first and second selecting means SLA and SLB for receiving input signals $LA_{i-1}$ and $LB_{i-1}$ from an adjacent propagation element $E_{i-1}$ as control signals, selecting input signals $DA_i$ and $DB_i$ from the lower adjacent layer, and respectively outputting output signals $LA_i$ and $LB_i$, and third selecting means SLD for receiving an input signal $U_j$ (j=an integer not less than 1), as a control signal, from the propagation operating unit connected to the propagation operating unit including the ith propagation element $E_i$ and belonging to the upper adjacent layer, selecting one of the input signal $LA_{i-1}$ and $LB_{i-1}$ from the adjacent propagation element $E_{i-1}$, and outputting the selection result, as an input signal $U_i$ to the propagation operating unit of the lower adjacent layer, and the last propagation element of the cascaded propagation elements outputting signals $LA_p$ and $LB_p$ as the input signals $DA_j$ (j=an integer not less than 1) and $DB_j$ to the propagation operating unit of the upper adjacent layer; and operating means connected to the propagation operating units belonging to the lowermost layer and constituted by an array of a plurality of operating units, of which an lth (l=an integer not less than 1) operating unit outputting 0 aM a1 aM a2 aM . . . aM ar, 1 aM a1 aM a2 aM . . . aM ar where r is an integer not less than 1, aM is an arbitrary operator, as output signals DA1 and DB1, to the corresponding propagation operating units belonging to the lowermost layer, and a data array of a1, a2, a3 . . . , and ar are elements of the scan target data array in a scan operating region assigned to the lth operating unit of the operating means.

With the above-described arrangement, according to the scanning system using tree structures of the present invention, the tree type propagation operating unit array as the core of the tree-structure scan operating apparatus allows the propagation operating units constituted by cascaded propagation elements, each consisting of three 2-input selectors, to be coupled to each other to form a regular tree structure without sacrificing the speed of processing. Therefore, the number of steps in design and development can be greatly reduced as compared with the conventional scheme. In addition, when the scanning system of the present invention is incorporated in a parallel data processing apparatus having a processor array, the function of each interface element is emulated by each processing element to practically reduce the hardware size of the overall scanning system to ¼ or less. Furthermore, when the scanning system is to be constituted by a plurality of LSIs, the propagation operating unit of the uppermost layer which is difficult to be incorporated in an LSI can be simply constituted by cascaded 2-input selectors easily realized by a Transistor Transistor Logic (TTL) or Programmable Array Logic (PAL). Therefore, the scanning system according to the present invention is very advantageous in realizing a small, economical parallel data processing apparatus having high scan operating performance.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 5 is a block diagram showing a scan operating apparatus according to an embodiment of the present invention;

FIG. 7A is a block diagram showing the basic arrangement of an interface element (IE20);

FIG. 7B is a block diagram for explaining another operation of an interface element (IE20') which receives data FL representing an activated state, in contrast to the interface element (IE20) shown in FIG. 7A;

FIGS. 11A and 11B are tables indicating the respective signal values in OR scan operation of up sweep and down sweep performed by the binary tree type scanning system shown in FIG. 10;

FIG. 12 is a block diagram showing an arrangement of an interface element (IE22) capable of executing addition scan operations in the binary scanning system using tree structures of the present invention;

FIGS. 13AI, 13AII, 13BI, 13BII, 13CI, 13CII, 13DI and 13DII are tables indicating the respective signals values in addition scan operations of up sweep and down sweep sequentially performed from the least significant digit in units of digits in the binary scanning system using tree structures of the present invention;

FIG. 14 is a block diagram showing another embodiment of the scanning system using tree structures of the present invention, which can set the start point of scanning at an arbitrary position;

FIGS. 16I and 16II are a table indicating the respective signal values in OR scan processing of up sweep and down sweep in the scanning system using tree structures shown in FIG. 14;

FIG. 19 is a block diagram showing still another propagation operating unit (POU) in the scanning system using tree structures of the present invention; and FIG. 20 is a block diagram showing a tree type propagation operating unit arrangement, in which the propagation operating unit (POU) shown in FIG. 19 is arranged on the uppermost layer.

DETAILED DESCRIPTION OF THE PREFERRED EMBODIMENTS

Figure 1:
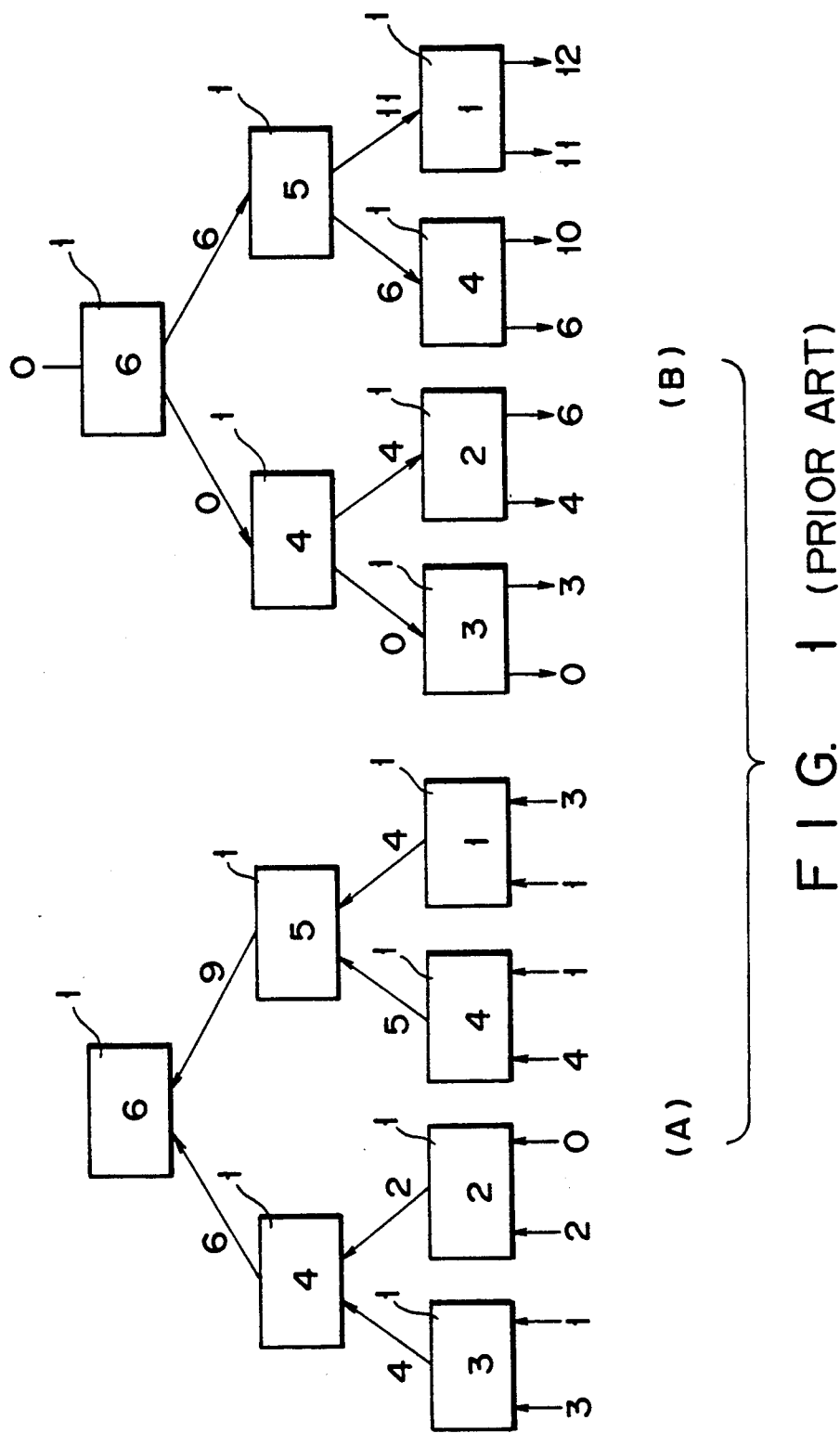
FIG. 1(A) and (B) is a block diagram showing the arrangement of propagation operating units of a conventional scanning system using tree structures.

Embodiments of the present invention will be described in detail below. FIG. 5 shows the arrangement of a single instruction stream/multiple data stream (SIMD) type parallel data processing apparatus incorporating a scanning system using tree structures constituted by a tree type propagation operating unit array 25 and an interface element array 50 according to the first embodiment of the present invention. In this parallel data processing apparatus, the propagation operating unit array 25 constituted by propagation operating units (POUs) 10 coupled to each other in the form of a tree is connected to the interface element (IE) array 50 through the propagation operating units 10 of the lowermost layer. The interface element (IE) array 50 is connected to a processing element (PE) array 60. In addition, the interface element (IE) array 50 and the processing element (PE) array 60 are connected to a control section 70. The overall apparatus is controlled by the control section 70.

Figure 6:
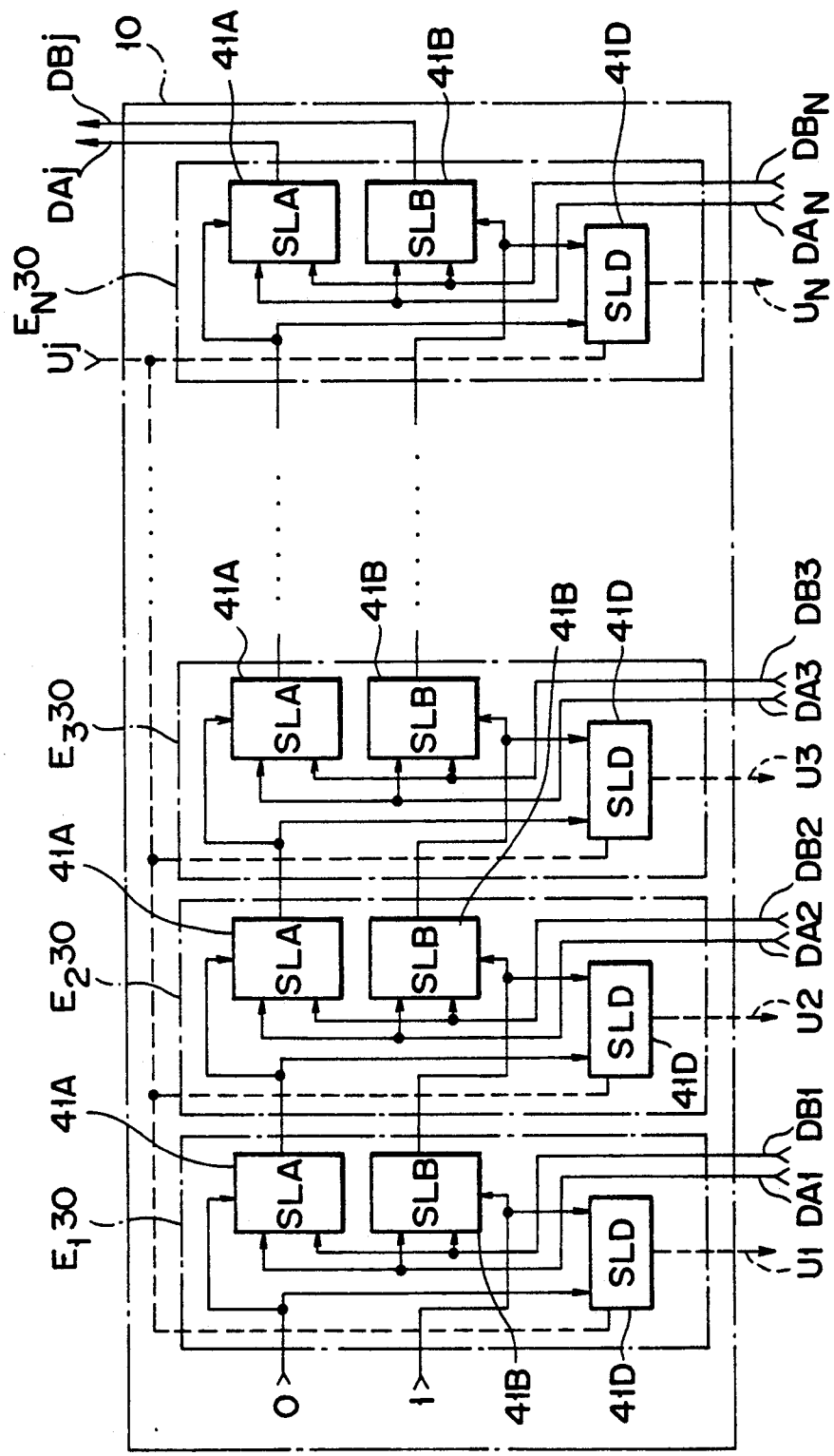
FIG. 6 is a block diagram showing the internal arrangement of a propagation operating unit 10 in FIG. 5.

FIG. 6 shows the detailed arrangement of the propagation operating unit (POU) 10. In this case, a propagation element $E_i$ 30 is constituted by three 2-input selectors i.e., a selector 41A (LSA), a selector 41B (SLB), and a selector 41D (SLD), each for selecting an A-side input when a control signal input is "0", and selecting a B-side input when the control signal input of "1".

This propagation element 30 receives a signal $U_j$ from the corresponding propagation operating unit of the upper adjacent layer and signals $DA_i$ and $DB_i$ from a propagation operating unit of the lower adjacent layer.

The propagation element 30 outputs signals $DA_j$ and $DB_j$ and signal $U_i$ to the propagation operating unit of the lower adjacent layer.

FIG. 7A shows the basic arrangement of an interface element IE20 which can be used for scan operations for an OR operation, an AND operation, a copy operation, or the like. The interface element IE20 is constituted by two ALUs 32 having the same arrangement and a selector 41D. The ALUs perform associative processing, designated by the control section 70, between data DI supplied from an element processor and "0" and "1", respectively. The ALUs then output the processing results as data $DA_j$ and data $DB_j$, respectively. The selector 41D selects one of the ALU outputs in accordance with an offset value with respect to this interface element IE, and determines the scan operating result at this point.

An operation of the scanning system using tree structures having the above-described arrangement will be described in detail below.

Processing directed from the lowermost layer to the uppermost layer (up sweep) will be described first with reference to FIG. 5. Similar to the conventional apparatus, scan operating data DI is input from the processing element (PE) array 60 to the interface element (IE) array 50. Each interface element IE performs associative processing, designated by the control section 70, between the input data DI and both "0" and "1" which able to propagate from the previous stage, and supplies the operating results, as data DA and data DB, to the corresponding propagation operating unit (POU) 10 of the lowermost layer.

As shown in FIG. 6, each propagation operating unit (POU) 10 determines which one of the results DA and DB, supplied from the lower adjacent layer, is true, in both cases wherein propagation data (offset) from the propagation operating unit (POU) 10 of the previous stage is "0" and "1", by sequentially causing the results DA and DB to propagate between the respective propagation elements upon selection of the selectors 41A and 41B. Thereafter, the propagation operating unit (POU) 10 supplies outputs of SLA and SLB from a propagation element $E_N$30 on the right end, as operating results DA and DB, to the propagation operating unit (POU) 10 of the upper adjacent layer.

The output signals DA and DB from the propagation operating units (POUs) 10 constituting a tree structure are determined from the lowermost layer to the uppermost layer, and propagation results with respect to both the offsets "0" and "1" are sequentially obtained by the propagation operating units (POUs) of the respective layers. When DA and DB up to the uppermost layer of the tree are determined by the above-described up sweep processing, processing from the uppermost layer to the lowermost layer (down sweep) becomes a significant operation.

As shown in FIG. 6, a logic value corresponding to processing ("0" for addition, OR operation, or the like; "1" for AND operation) is supplied in advance as an input $U_j$ to the propagation operating unit (POU) 10 of the uppermost layer, i.e., an offset with respect to the tree as a whole. Therefore, as is apparent from FIG. 6, one of the two output signals from the propagation element $E_i$ of the previous stage, which have been determined by up sweep, is selected by the selector 41D and is output, as a true offset $U_i$ to the lower adjacent layer. The propagation element $E_i$ of each propagation operating unit (POU) 10 sequentially calculates the true offset $U_i$ of each propagation operating unit (POU) 10 of the lower adjacent layer on the basis of the true offset $U_i$ sent from the upper adjacent layer and the output signals from the propagation element $E_i$, which have been determined by the processing directed from the lowermost layer to the uppermost layer, and outputs the offset $U_i$ to the lower adjacent layer. As a result, the final scan operating result is obtained as a scan data output fd from each interface element IE (FIGS. 7A to 7D).

Note that, as shown in FIG. 5, "0" or "1" is supplied, as an offset, to the overall tree in accordance with processing on the assumption that scan operations are solely executed by the parallel data processing apparatus incorporating the scanning system using tree structures according to the first embodiment of the present invention. That is, no previous scan operating region is present. In contrast to this, as described with reference to the following embodiments, the scanning system of the present invention can be incorporated in a larger scanning system as a part of a tree. The third and fourth embodiments of the present invention described later are equivalent to scanning system incorporating the first or second embodiment as a part of a tree. In this case, the overall scanning system may not have a regular tree structure, unlike the first and second embodiments. In such a case, since a previous scan operating region is present, its scan operating result must be provided as an offset.

Figure 8:
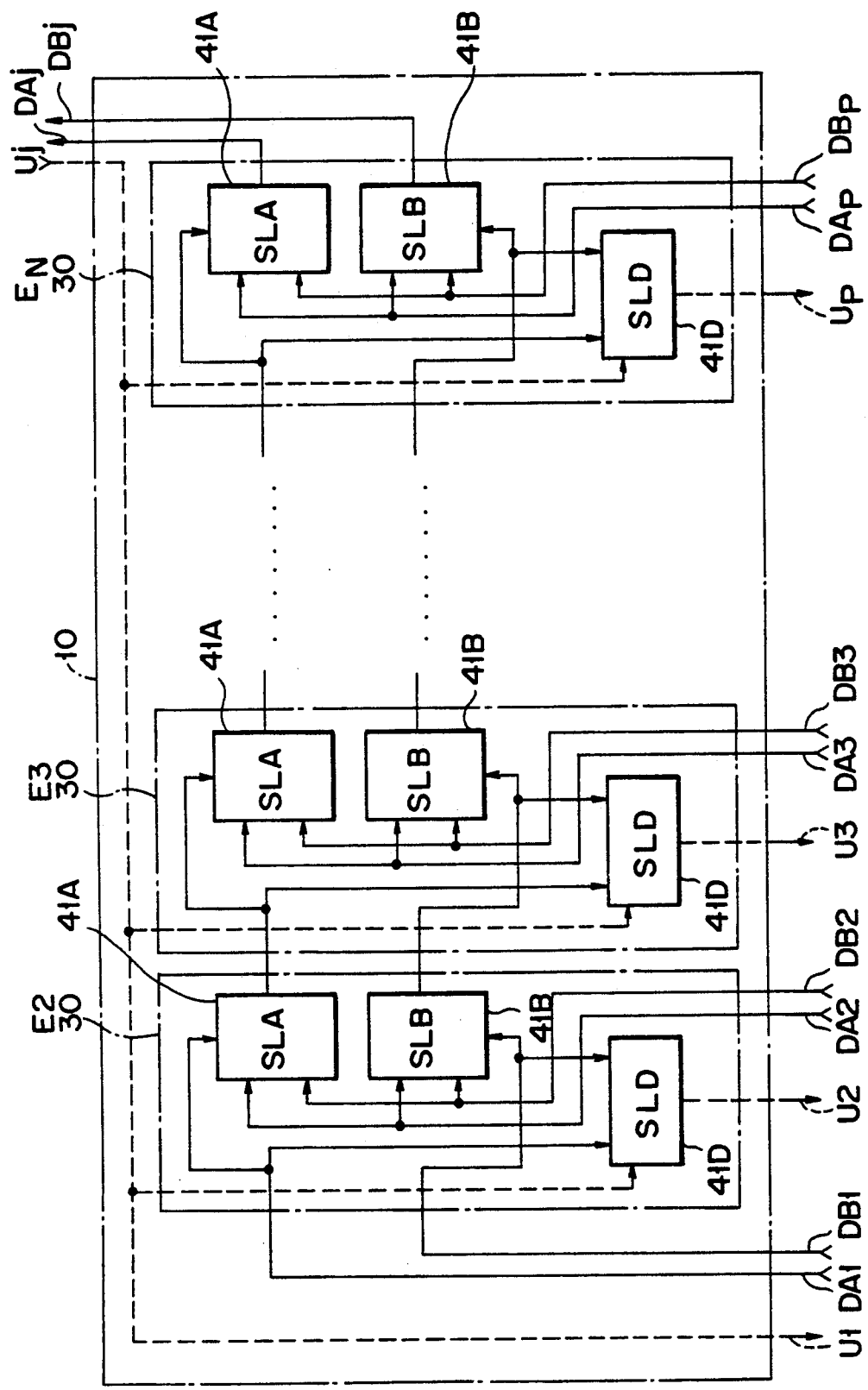
FIG. 8 is a block diagram showing the arrangement of a propagation operating unit 10, from which a redundant portion of the internal arrangement of the propagation operating unit 10 shown in FIG. 6 is omitted.

FIG. 8 shows the arrangement of a propagation operating unit (POU) 10 from which a redundant portion in FIG. 6 is omitted. The arrangement shown in FIG. 8 is different from that shown in FIG. 6 in that the first propagation element $E_1$ added to the arrangement to explain the operation principle is replaced with simple coupling lines. These coupling lines can be easily introduced on the basis of the fact that input signals from a previous stage to the propagation element $E_1$ are constants "0" and "1", and the selection function of each of selectors SLA 41A, SLB 41B, and SLB 41C are equivalent to connections.

Figure 4:
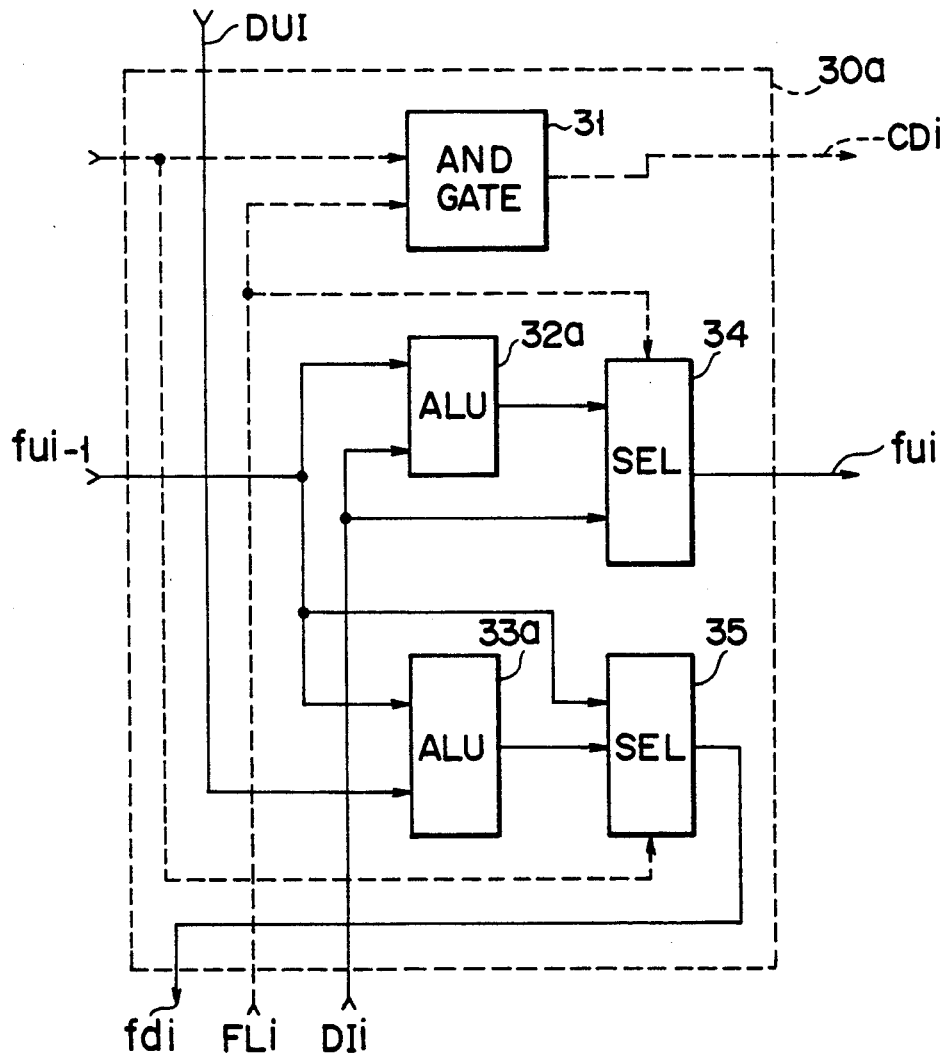
FIG. 4 is a block diagram showing the internal arrangement of a propagation element 30a in FIG. 3.
Figure 9:
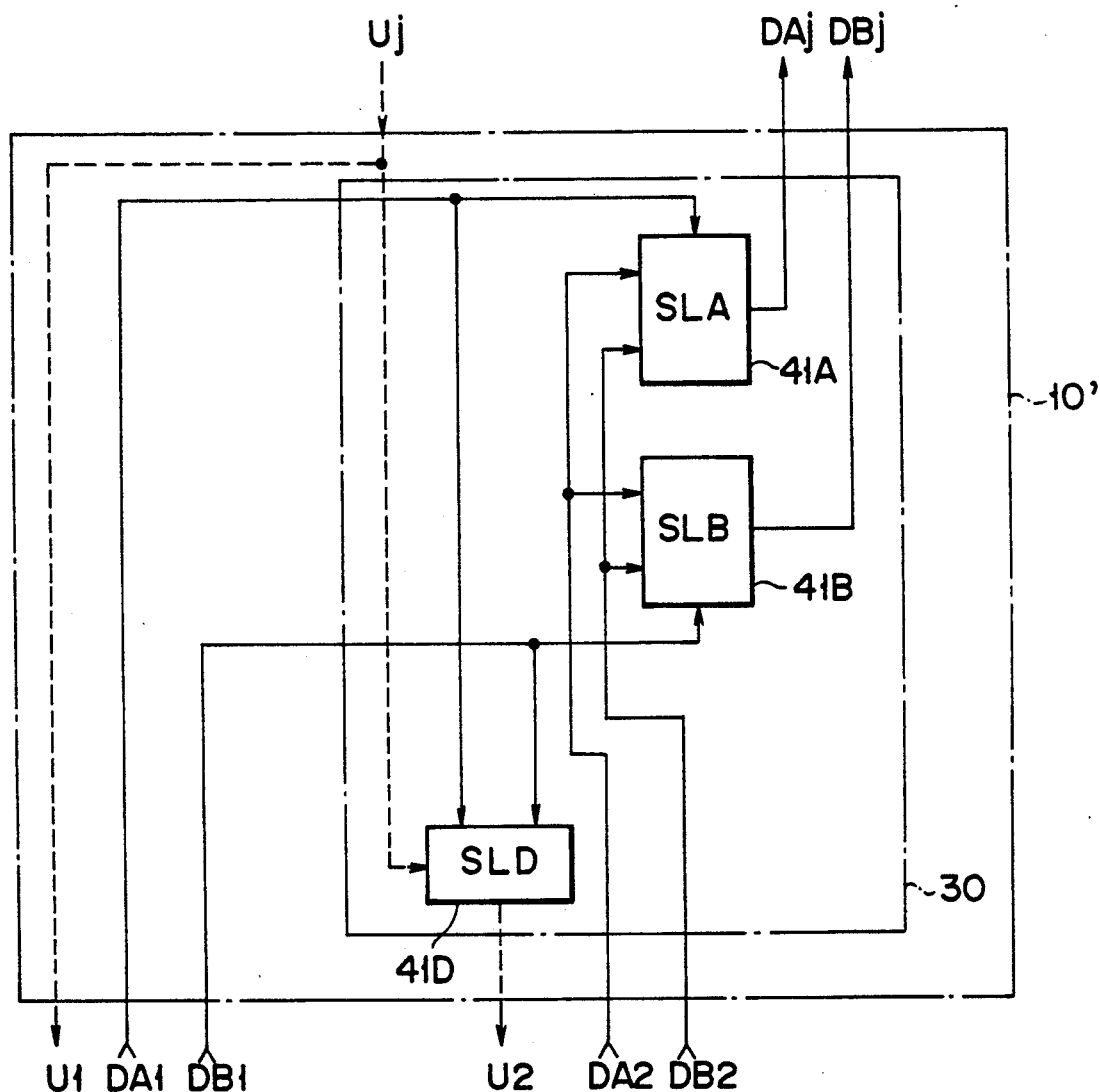
FIG. 9 is a block diagram showing the arrangement of a binary propagation operating unit 10' in the scanning system according to the present invention.
Figure 10:
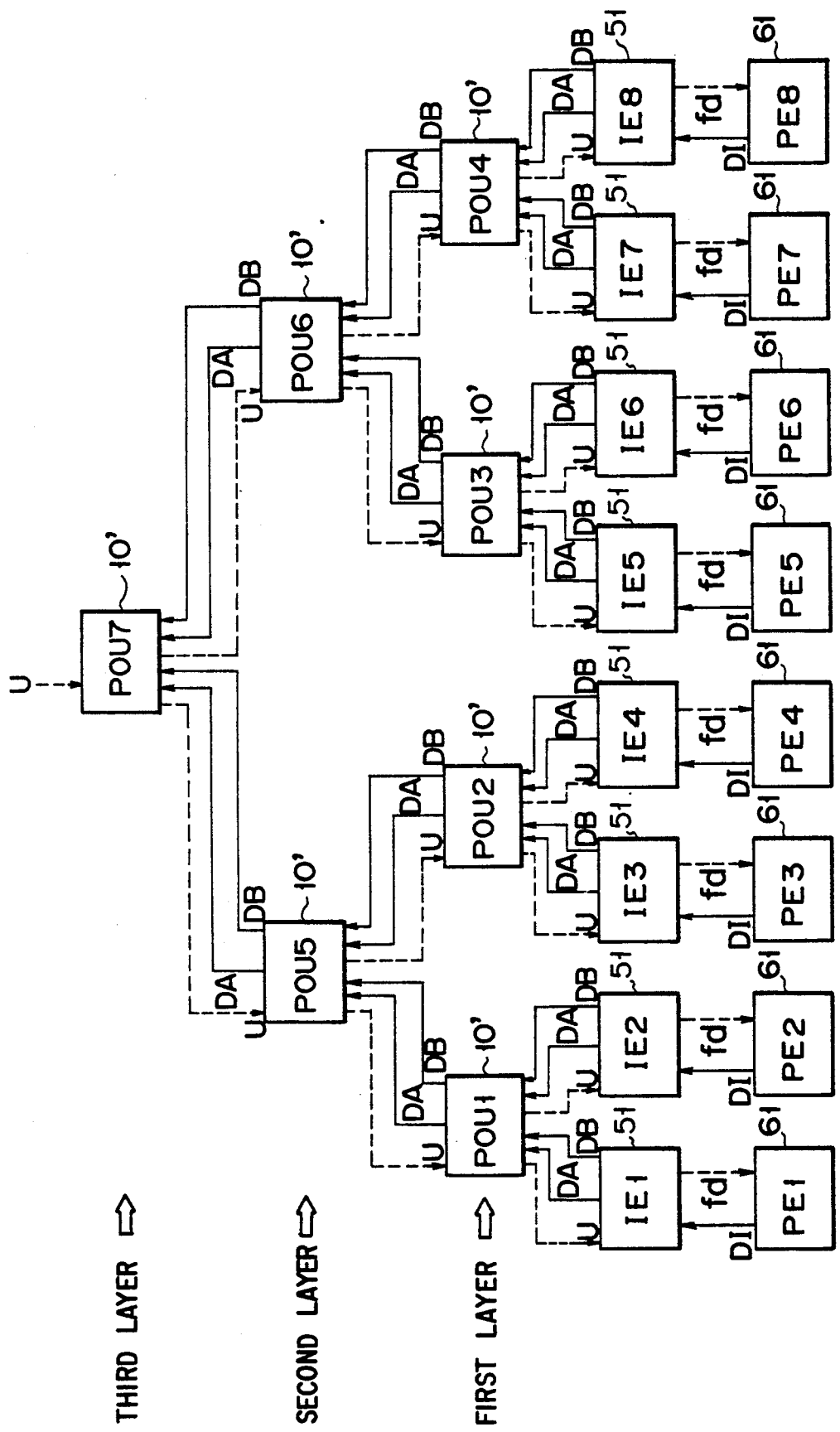
FIG. 10 is a block diagram showing an embodiment of the scanning system of the present invention which constitutes a binary tree structure using the propagation operating unit shown in FIG. 9.

The contents of scan operations will be described further in detail below, in which operators represent an OR operation and addition. To be compared with the prior art shown in FIG. 4, the scanning system employs a tree structure shown in FIG. 10 using a binary propagation operating unit (POU) 10' in FIG. 9. OR scan operating will be described first. Since this operating can be performed for each digit independently, it suffices to describe the scan operations of only one digit. OR scan operating from the left to the right with respect to a 1-bit data array {0, 0, 1, 0, 1, 0, 1, 1} supplied from a propagation element (PE) array 61 as an output data DI to an interface element (IE) array 51 will be exemplified. In this case, as an interface element IE, the one shown in FIG. 7A is used without any modification, and the function of ALUs is set to the OR mode by designation from a control section 70 (not shown in FIG. 10). Input/output signals to/from each interface element IE 51 and each propagation operating unit (POU) 10' are sequentially obtained on the basis of the above-described conditions, provided that each 2-input selector is operated to select an A-side input when a control signal is "0" and select a B-side input when the control signal is "1". FIGS. 11A and 11B respectively show the result obtained in up sweep processing and down sweep processing. It is apparent from the comparison between an output DI in up sweep processing and an output fd in down sweep processing that OR scan operations are realized. In this case, an input U to the propagation operating unit POU of the uppermost layer is an offset with respect to the overall tree shown in FIG. 10. In this case, however, since scan outside of the region covered by the tree in FIG. 10 is not considered, "0" is input.

Figure 3:
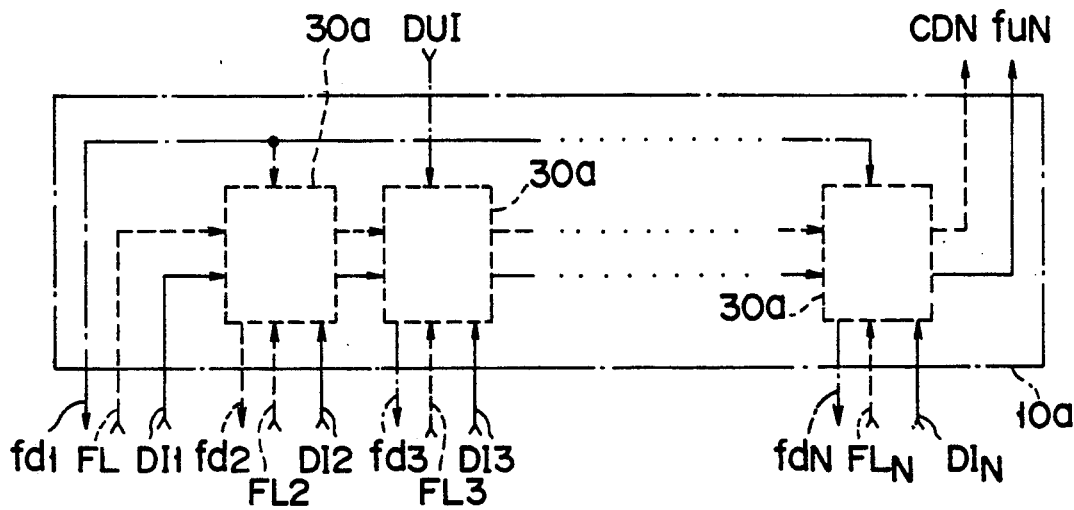
FIG. 3 is a block diagram showing the internal connection of a propagation operating unit 10a in FIG. 2.

Additional scan operations will now be described. In this case, scan operations must be sequentially performed from the least significant digit. In consideration of this point and comparison with the conventional apparatus, addition scan operating from the left to the right with respect to a data array {3, 1, 2, 0, 4, 1, 1, 3} identical to the scan target data array in FIG. 5 will be exemplified. In this case, as an interface element IE, an element having the arrangement shown in FIG. 12 is used to handle carries required for addition. In this case, the two ALUs 32 of the interface element IE20 are replaced with two ALUs 32' capable of executing 1-bit addition, and a selector 41C and a carry register 45 are added to select one of carry outputs $CO_A$ and $CO_B$ from the two ALUs 32', 32' in accordance with an input $U_j$ and use the selected carry output as a carry input for the next upper digit operation. FIGS. 13A to 13D respectively show tables indicating input/output signal values in up sweep processing and down sweep processing in a case wherein the carry register 45 is cleared to be "0", and addition scan operating is sequentially performed from the least significant digit. In this case, outputs fd from the respective interface elements IE in down sweep processing represent a scan operating result and can be expressed as {3, 4, 6, 6, 10, 11, 12, 15} in decimal notation. This result is the final scan operating result but is not an array of offset with respect to each processing element PE as in the prior art shown in FIGS. 3 and 4. Therefore, the output data DI need not be added to each other in the respective processing elements PE to obtain the final result as in the prior art.

Figure 15:
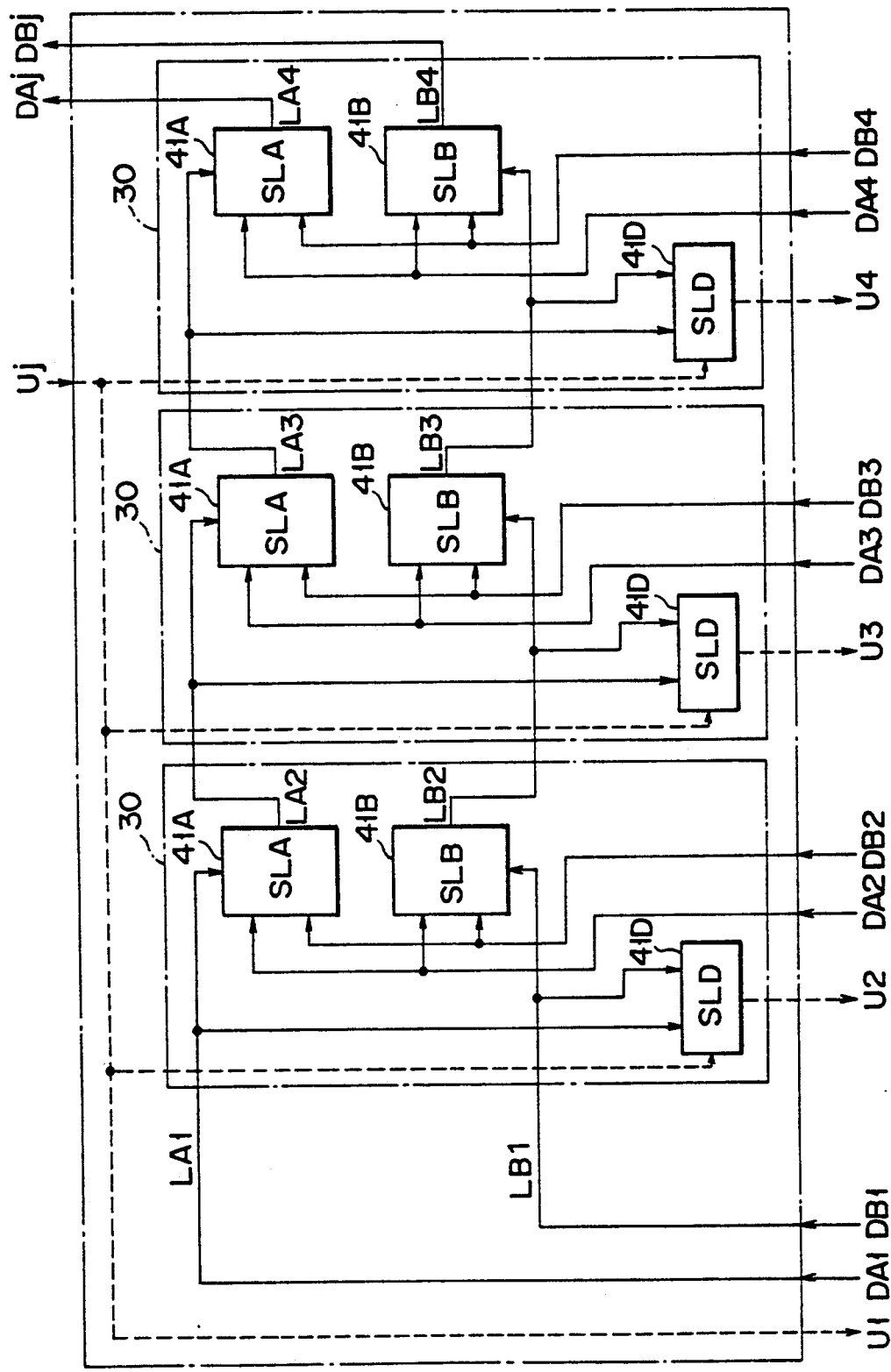
FIG. 15 is a block diagram showing a quaternary propagation operating unit (POU) used for the scanning system using tree structures shown in FIG. 14.

In the first embodiment, a scan start point cannot be set in the middle of a scan data array. The second embodiment of the present invention, in which a scan start point can be set at an intermediate position, will be described below. A scanning systems using tree structures and a parallel data processing apparatus incorporating the same of this embodiment have the same arrangements as those of the first embodiment except for an interface element IE20'. Hence, only the arrangement of the interface element IE20' is shown in FIG. 7B. The interface element IE20' in FIG. 7B is different from the one shown in FIG. 7A in that each ALU 32b has a combination of the functions of the ALU 32a and the SEL 34. More specifically, the interface element IE20' directly outputs input data DI as data $DA_j$ and data $DB_j$ when scan start point attribute data FL input from a processor element represents an active state. When the data FL does not represent an active state, the interface element IE20' performs associative processing, designated by a control section 70, with "0" and "1", and outputs the operating results as data $DA_j$ and data $DB_j$ like the interface element IE in FIG. 7A. As is apparent from the function of the interface element IE20', the data DI input to the interface element IE can be directly output as the data $DA_j$ and the data $DB_j$ by providing data representing an active state as the data FL, regardless of the offset, thus realizing the function of a scan start point. In addition, as is apparent from the function of the tree type propagation operating unit array 25, new scan operations are hierarchically executed from this scan start point to the next scan start point. Scan processing associated with OR according to the second embodiment will be described in detail below. The scanning system has the arrangement shown in FIG. 14, which is different from that of the apparatus of the first embodiment shown in FIG. 10 in that a tree having a two-layer structure is formed by using quaternary propagation operating units (POUs), each shown in FIG. 15, for the first layer. This arrangement is employed to show that a propagation operating unit (POU) having an arbitrary size can be used in the present invention. Since the processing is associated with an OR operation, the interface element IE20' shown in FIG. 7B is used as the interface element IE of this embodiment, in which the function of each ALU 32b is set to an OR operation. As the arrangement of the scan target data DI, the same arrangement as that used for the OR scan operations in the first embodiment, i.e., {0, 0, 1, 0, 1, 0, 1, 1}, is used. The arrangement of the attribute data FL of the scan start point corresponding to each element of the data DI is {1, 0, 0, 0, 0, 1, 0, 0}. In this case, "1" as the value of the data FL represents an active state; and "0", an nonactive state. FIGS. 16I and 16II show tables respectively indicating the values of input/output signals to/from propagation operating units (POUs) 1 and 2, and the signal values of propagation element outputs LA and LB in each propagation operating unit in both up sweep processing and down sweep processing under the above-described conditions. As is apparent from the table of down sweep, the scan result is {0, 0, 1, 1, 1, 0, 1, 1}, and setting control of a scan start point is properly realized. Although not described here, in order to realize the scan start point setting control function with respect to addition scan operating, a function of directly outputting the input data DI as the outputs DA and DB from the two ALU 32' and a function of outputting "0" as the outputs $CO_A$ and $CO_B$ when the data FL represents an active state must be added to the interface element IE22 shown in FIG. 12.

Figure 2:
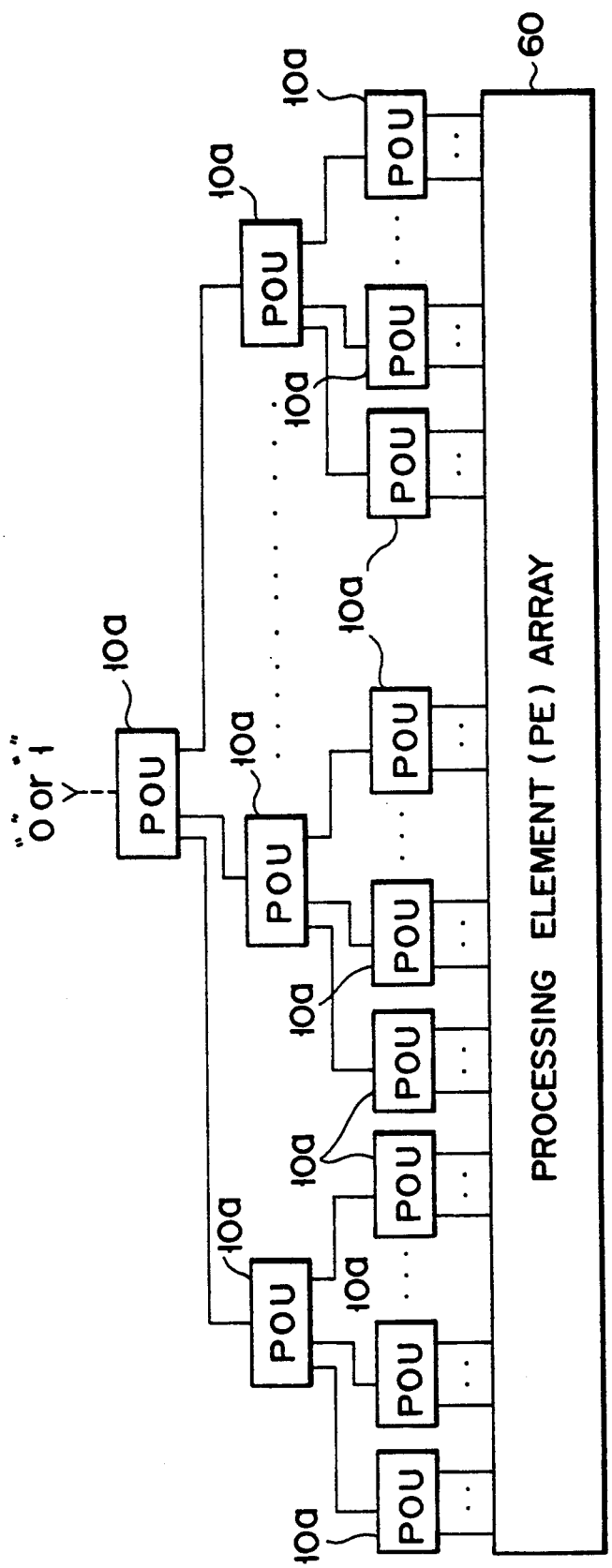
FIG. 2 is a block diagram showing a conventional parallel data processing apparatus.

As can be understood from the above, the advantages of the scanning system using tree structures of the present invention are: firstly, each propagation element (E) 30 can be constituted by only three 2-input selectors without requiring a processing unit, a memory, a pipeline register, and the like as in the conventional scheme, and secondly, scan operating of a target data array can be performed in units of partial regions separately without adding scan start point setting hardware to a tree type propagation operating unit array, because the scan start point setting function for scan regions is realized by supplying the same operand data to the two propagation operating paths as in the second embodiment. Therefore, the hardware size of the tree type propagation operating unit array can be reduced to ¼ or less as compared with a case wherein selective propagation is applied to the conventional scheme shown in FIG. 2 which is capable of high-speed processing and has a small hardware size. This is because a 2-input selector can be constituted by a number of gates not more than ¼ that for a 1-bit processing unit having addition and logic operations required for the conventional scheme.

When the overall scanning system is taken into consideration, it looks as if the processing unit in each propagation element is simply moved into each interface element of the interface element (IE) array 50, which is not required in the conventional Scheme. Hence, it looks as if no reduction in hardware size is achieved. However, since the arrangement of the interface elements IE is a one-dimensional regular array, a high packing density can be obtained, and the practical hardware size can be greatly reduced. In addition, when a scanning system using tree structures is to be incorporated in a single instruction stream/multiple data stream (SIMD) type parallel processing as in the first and second embodiments, an interface element (IE) may be integrated with a processing element (PE), or the function of an interface element (IE) may be emulated by a processing element to practically omit an interface element (IE) array. Therefore, the hardware size of the overall scanning system can also be reduced to about ¼.

Furthermore, since the scanning system of the present invention is designed on the assumption that scan operations are performed in units of bits, scan operating which can be executed by the apparatus is limited to scan operations which can be divided into bits. However, since all important scan operations such as addition scan operating, logic scan operating, MIN scan operating, and MAX scan operating, widely used for parallel operating, can be performed in units of bits, this limitation poses no practical problems.

Figure 7C:
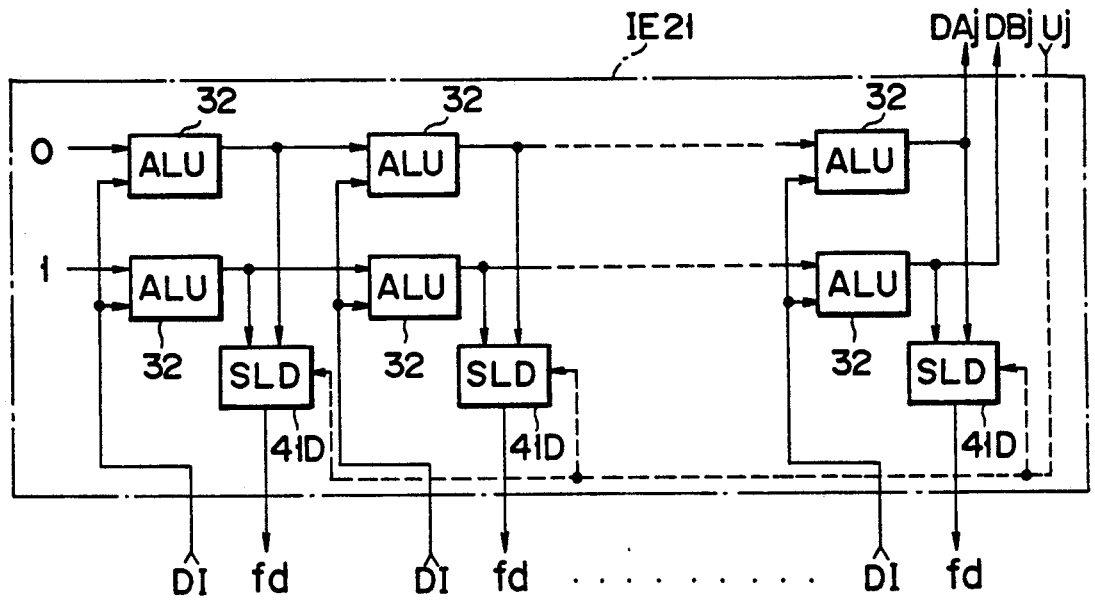
FIG. 7C is a block diagram showing the arrangement of an interface element (IE21) for performing two types of scan operations with respect to a plurality of elements.
Figure 7D:
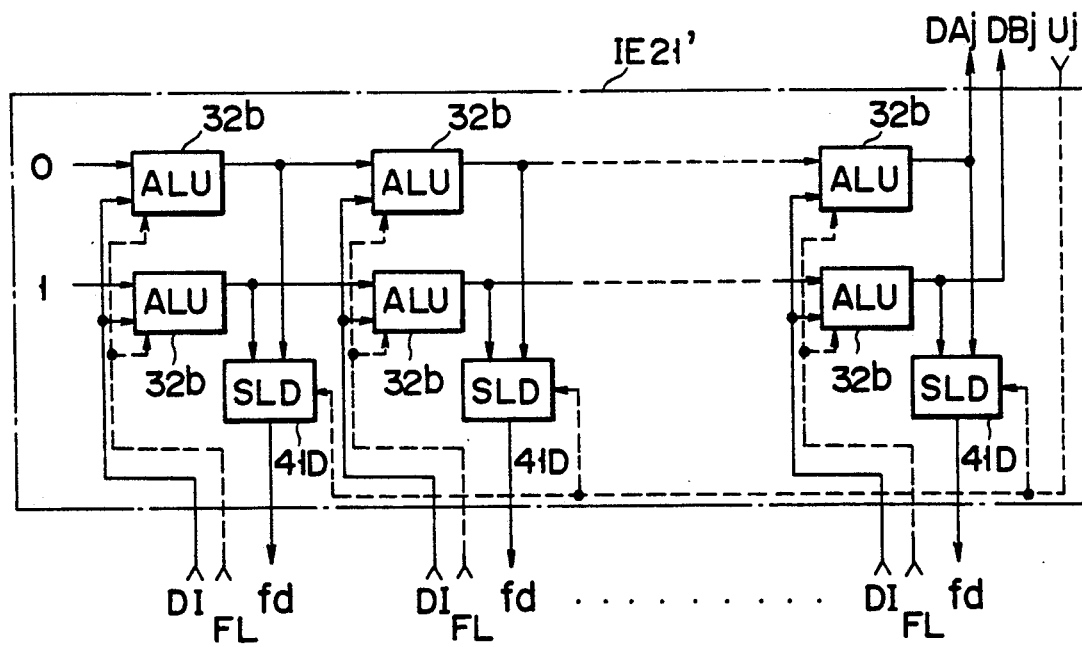
FIG. 7D is a block diagram for explaining another operation of an interface element (IE21') which receives data FL representing an activated state, in contrast to the interface element (IE20) shown in FIG. 7C.

In this case, the interface element (IE) 50 is designed to perform two-way scan operating with respect to only one element of the scan target data array. However, there is a method of designing an interface element array for performing two-way scan operating with respect to a plurality of elements. FIGS. 7C and 7D respectively show interface elements IE obtained by applying this design method to the interface elements IE of the first and second embodiments. In these interface elements, a combination of signals DI, FL, and fd is input/output to/from each single processing element. If a scanning system is to be mounted on an LSI, this arrangement can be realized to have a size equal in area to that of the arrangement shown in FIG. 7A or 7B.

Figure 17:
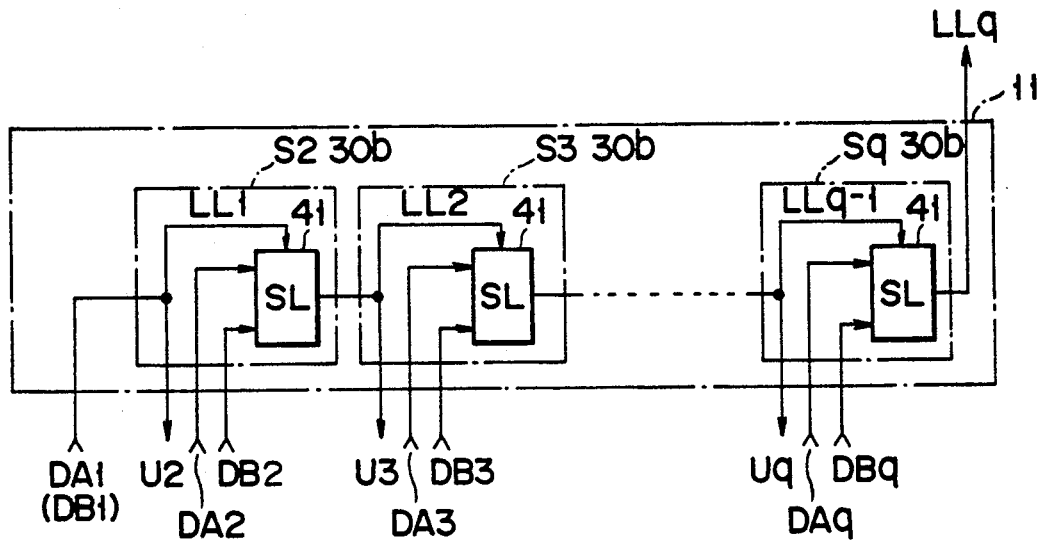
FIG. 17 is a block diagram showing another propagation operating unit (POU) in the scanning system using tree structures of the present invention.
Figure 18:
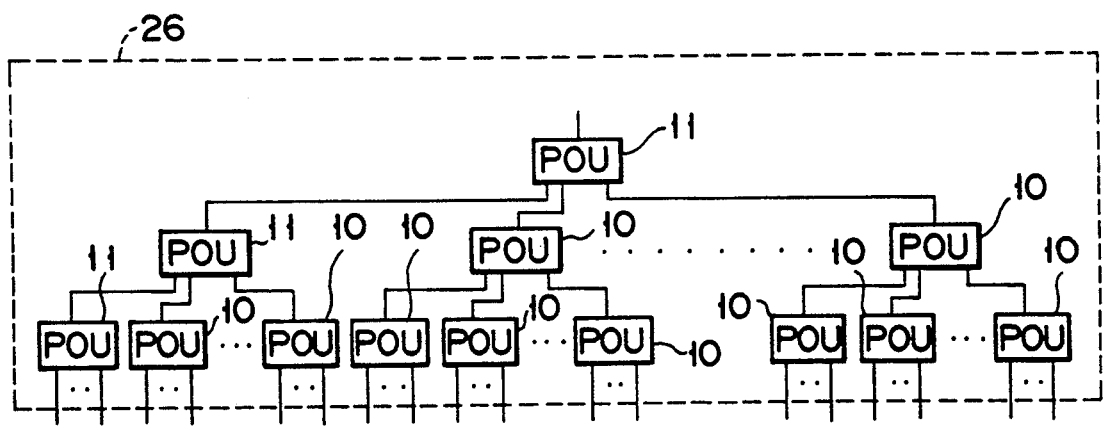
FIG. 18 is a block diagram showing a tree type propagation operating unit arrangement, in which the propagation operating unit (POU) shown in FIG. 17 serves as a first propagation operating unit of each layer.

The third embodiment of the present invention will be described next. Since the arrangement and operation of this embodiment are the same as those of the first and second embodiments, except for each propagation operating unit 11 located at a start position, and a tree type propagation unit array 26. FIGS. 17 and 18 show only the propagation operating unit 11 located at the first position and the tree type propagation operating unit array 26. In this embodiment, the propagation operating unit at the start position of each layer is simplified in consideration of the fact that a start position always corresponds to a scan start point in the first and second embodiments. That is, the unit at the start position of the lowermost layer of the tree type propagation operating unit array always corresponds to a scan start point. In this unit, therefore, propagation with respect to two offsets need not be performed. In addition, since inputs $DA_1$ and $DB_1$ to the left end of the unit correspond to a scan start point, they are equal to each other. In consideration of these conditions, the start propagation operating unit of the lowermost layer has the arrangement shown in FIG. 17. Each propagation element $S_i$ is constituted by only one 2-input selector (SL) 41 In addition since only one propagation path is present, this unit has only one output to the upper layer. This means that propagation operating with respect to two offsets need not be performed in the start propagation operating unit of the layer next to the lowermost layer. Therefore, the start propagation operating unit of the second layer can be constituted by a unit having the same arrangement as that of the start propagation operating unit of the lowermost layer. Similarly, the start units of the layers subsequent to the second layer can be constituted by identical start unit, thus forming the tree type propagation operating unit array shown in FIG. 18. In the arrangement of the third embodiment, the hardware size is reduced by an amount corresponding to the degree of simplification of each start propagation operating unit.

In the fourth embodiment, a scanning system is exemplified, which is incorporated in a parallel processor. Since this embodiment has the same arrangement as that of the first and second embodiments except for a propagation operating unit 12, and a tree type propagation operating unit array 27, FIGS. 19 and 20,show only the propagation operating unit 12 and the tree type propagation operating unit array 27. This embodiment is different from the first and second embodiments in that an output from the last propagation element of the propagation operating unit of the uppermost layer is fed back as an offset. This feedback operation is performed to loop a scan operating path. With this operation, overall scanning system has a uniform structure without any end portion. In other words, an end portion can be set at an arbitrary position by properly setting a scan start point. In this embodiment, however, in order to obtain a uniform structure as a whole, the propagation operating unit located at the start point of each layer cannot be simplified on the basis of a fixed scan start point as in the third embodiment. Another difference between the fourth embodiment and the first and second embodiment is that only one propagation path is set for the propagation operating unit of the uppermost layer in the fourth embodiment. This is because identical inputs DA and DB which sequentially propagate from each unit of the lowermost layer including the scan start point are always present in the propagation operating unit of the uppermost layer. Therefore, propagation operations through the two paths, i.e., the A and B paths in the propagation operating unit 12 are completely the same, and one of the propagation operations can be omitted. When the scanning system of the present invention is to be incorporated in a parallel data processing apparatus having a structure in which the two ends of a processor array are connected to form a loop, the loop structure of the fourth embodiment is very advantageous in uniformity of the routing function. In addition, in terms of simplification of the propagation operating unit of the uppermost layer, this embodiment is advantageous for the following reason. When the scanning system of this embodiment is realized by a plurality of LSIs, each incorporating a scanning system smaller in size than the scanning system of this embodiment, the propagation operating unit of the uppermost layer, which cannot be mounted in each LSI, can be easily realized by a (TTL) or (PAL).

Scan operations have been described above on the assumption that the respective interface element IEs have the same function. However, the behavior of each propagation operating unit is irrelevant to the processing function of each interface element IE and can respond to scan operating whose processing contents change in the process of scan by watching the processing function of each arithmetic and logic unit (ALU) in each interface element IE in accordance with the change.

Additional advantages and modifications will readily occur to those skilled in the art. Therefore, the invention in its broader aspects is not limited to the specific details, and representative devices, shown and described herein. Accordingly, various modifications may be without departing from the spirit or scope of the general inventive concept as defined by the appended claims and their equivalents.

What is claimed is:

1. A scanning system comprising two operating parts, one of the two operating part including:

a tree structural array composed of hierarchical layers arranged to include an upper layer and a lower layer, each layer in said tree structural array having propagation operating units which, except in said upper layer, are formed into at least one group, with one group being coupled to a particular one of said propagation operating units in said upper layer, and each of said propagation operating units having at least one propagation element of which propagation element Ei (where i is an integer) has a first, second and third select means SLA, SLB and SLD, respectively, said first and second select means SLA and SLB selecting one of two input signals $DA_i$ and $DB_i$ from said lower layer by using input signals $LA_{1+1}$ and outputting the selected results as signals $LA_i$ and $LB_i$ for providing select control of the first and second select means SLA and SLB in an adjacent propagation element $E_{i+1}$ and for input to the third select means SLD in the propagation element $E_{i+1}$, and said third select means SLD selecting one of said two input signals $LA_{i-1}$ and $LB_{1-1}$ by using an input signal $U_j$ (wherein j is an integer) from said particular propagation operating unit in the upper layer and outputting the selected result to said propagation operating unit in the lower layer as an output signal $U_i$, and of which the last propagation element $E_N$ of said propagation operating unit outputs the selected results of the selected means SLA and SLB as signals $DA_j$ and $DB_j$ to said particular propagation operating unit in the upper layer; and the other of the two operating parts including:

a one dimensional array connected to the propagation operating units in the lower layer and composed of operating units of which the lth operating unit outputting $0 \oplus a_1 \oplus a_2 \oplus \ldots \oplus a_r$, $1 \oplus a_1 \oplus a_2 \oplus \ldots \oplus a_r$ as signals $DA_j$, and $DB_j$, to one of the corresponding propagation operating units in the lower layer, receiving $U_j$, from one of the corresponding propagation operating units in the lower layer and selecting one between pairs of $0 \oplus a_1 \oplus a_2 \oplus \ldots \oplus a_r$ and $1 \oplus a_1 \oplus a_2 \oplus \ldots \oplus a_2 \oplus \ldots \oplus a_r$ by the signal $U_j$, as an operation result, where l, r and j' are integers, $\oplus$ is an arbitrary operator and a data array of $a_1, a_2, a_3, \ldots$, and $a_r$ is a subarray of a scan target data array assigned to the lth operating unit of the one dimensional array.

2. An apparatus according to claim 1, wherein the propagation operating unit located at the start position in each layer of said tree structural array has at least one propagation element, of which propagation element Sk (where k is an integer) has select means SL for selecting one of input signals $DA_k$ and $DB_k$ from the lower layer by using an input signal $LL_{k-1}$ and outputting the selected result to an adjacent propagation element $S_{k+1}$ as a signal $LL_k$ for select control of the select means SL in the adjacent propagation element $S_{k+1}$ and to said propagation operating unit in the lower layer as a signal $U_k$, and of which the last propagation element $S_q$ outputs signals $LL_q$ as the input signal $DA_1$ or the input signal $DB_1$ to the propagation operating unit located at the start position of the upper layer.

3. An apparatus according to claim 1, wherein the propagation operating unit in the upper layer of said three structural array has at least two cascaded propagation elements, of which propagation element $S_k$ (where k is an integer) has select means SL selecting one of input signals $DA_k$ and $DB_k$ from the lower layer by using an input signal $LL_{k-1}$ and outputting the selected result to the adjacent propagation element $S_{k+1}$ as a signal $LL_k$ for select control of the select means SL in the adjacent propagation element $S_{k+1}$ and to said propagation operating unit in the lower layer as a signal $U_k$, and of which the last propagation element $S_q$ is fed back to the first propagation element $S_1$ as an input signal $LL_o$.

4. An apparatus according to claim 1, wherein the lth operating unit of said one dimensional array outputs $0 \oplus a_1 \oplus a_2 \oplus \ldots \oplus a_r$, $1 \oplus a_1 \oplus a_2 \oplus \ldots \oplus a_r$, $0 \oplus a_1 \oplus a_2 \oplus \ldots 0 a_r$ as signals $DA_{j'}$ and $DB_{j'}$ to one of the propagation operating units in the lower layer and selects one between pairs of $0 \oplus a_1 \oplus a_2 \oplus \ldots \oplus a_r$, $1 \oplus a_1 \oplus a_2 \oplus \ldots \oplus a_r$ and $0 \oplus a_1 \oplus a_2 \oplus \ldots \oplus a_r$ by said receiving signal $U_{j'}$ as an operation result when all data $FL_1, FL_2, \ldots,$ and $FL_r$ corresponding to data $a_1, a_2, \ldots,$ and $a_r$ represent an inactive state;

and wherein such lth operating unit outputs $a_s \oplus a_{s+1} \oplus a_{s+2} \oplus \ldots \oplus a_r$ (where s is a maximum value of an affix of data FL representing an active state) as signal $DA_{j'}$ and $DB_{j'}$ and makes said $a_s \oplus a_{s+1} \oplus a_{s+2} \oplus \ldots \oplus a_r$ an operation result, when at least one of the data $FL_1, FL_2, \ldots,$ and $FL_r$ represents the active state.

5. A scanning system comprising two operating parts, one of the two operating parts including:

a tree structural array composed of hierarchical layers arranged to include a lowermost layer, an uppermost layer, and at least one layer therebetween having an associated upper adjacent layer and an associated lower adjacent layer, each layer in said tree structural array having propagation operating units which, except in said uppermost layer, are formed into at least one group, with one group being coupled to a particular one of said propagation operating units in said associated upper adjacent layer, and each of said propagation operation units having at least one propagation element of which propagation element $E_i$ (where i is an integer) has first, second and third select means SLA, SLB and SLD, respectively, said first and second select means SLA and SLB selecting one of two input signals $DA_i$ and $DB_i$ from said associated lower adjacent layer by using input signals $LA_{i-1}$ and $LB_{i-1}$ and outputting the selected results as signals $LA_i$ and $LB_i$ for providing select control of the first and second select means SLA and SLB in an adjacent propagation element $E_{i+1}$ and for input to the third select means SLD in the propagation element $E_{i+1}$, and said third select means SLD selecting one of said two input signal $LA_{i-1}$ and $LB_{i-1}$ by using an input signal $U_j$ (where j is an integer) from said particular propagation operating unit in the associated upper adjacent layer and outputting the selected result to a propagation operating unit in the associated lower adjacent layer as an output signal $U_i$, and of which the last propagation element $E_N$ of said propagation operating unit outputs the selected results of the select means SLA and SLB as signals $DA_j$ and $DB_j$ to said particular propagation operating unit in the associated upper adjacent layer; and the other of the two operating parts including:

a one dimensional array connected to the propagation operating units in the lowermost layer and composed of operating units of which the lth (where l is an integer not less than 1) operating unit outputting $0 \oplus a_1 \oplus a_2 \oplus \ldots \oplus a_r$, $1 \oplus a_1 \oplus a_2 \oplus \ldots \oplus a_r$ as signals $DA_{j'}$ and $DB_{j'}$ to one of the corresponding propagation operating units in the lowermost layer, receiving $U_{j'}$ from one of the corresponding propagation operating units in the lowermost layer and selecting one between operation pairs of $0 \oplus a_1 \oplus a_2 \oplus \ldots \oplus a_r$ and $1 \oplus a_1 \oplus a_2 \oplus \ldots \oplus a_r$ as an operation result by the signal $U_{j'}$, where l, r and j' are integers, $\oplus$ is an arbitrary operator and a data array of $a_1, a_2, a_3, \ldots,$ and $a_r$ is a subarray of a scan target data array assigned to the lth operating unit of the one dimensional array.

6. An apparatus according to claim 5, wherein the propagation operating unit located at the start position in each layer of said tree structural array has at least one propagation element, of which propagation element $S_k$ (where k is an integer) has select means SL for selecting one of input signals $DA_k$ and $DB_k$ from the associated lower adjacent layer by using an input signal $LL_{k-1}$ and outputting the selected result to the adjacent propagation element $S_{k+1}$ as a signal $LL_k$ for select control of the select means SL in the adjacent propagation element $S_{k+1}$ and to said propagation operating unit in the associated lower adjacent layer as a signal $U_k$, and of which the last propagation element $S_q$ outputs signal $LL_q$ as the input signal $DA_1$ or the input signal $DB_1$ to the propagation operating unit located at the start position of the associated upper adjacent layer.

7. An apparatus according to claim 5, wherein the propagation operating unit in the uppermost layer of said tree structural array has at least two cascaded propagation elements, of which propagation element $S_k$ (where k is an integer) has select means SL selecting one of input signal $DA_k$ and $DB_k$ from the associated lower adjacent layer by using an input signal $LL_{k-1}$ and outputting the selected result to the adjacent propagation element $S_{k+1}$ as a signal $LL_k$ for select control of the select means SL in the adjacent propagation element $S_{k+1}$ and to said propagation operating unit in the associated lower adjacent layer as a signal $U_k$, and of which the last propagation element $S_q$ is fed back to the first propagation element $S_1$ as an input signal $LL_o$.

8. An apparatus according to claim 5, wherein the lth operating unit of said one dimensional array outputs $0 \oplus a_1 \oplus a_2 \oplus \ldots \oplus a_r$, $1 \oplus a_1 \oplus a_2 \oplus \ldots \oplus a_r$ as signals $DA_{j'}$ and $DB_{j'}$ to one of the propagation operating units in the lowermost layer and selects one between operation results pairs of $0 \oplus a_1 \oplus a_2 \oplus \ldots \oplus a_r$ and $1 \oplus a_1 \oplus a_2 \oplus \ldots \oplus a_r$ by said receiving signal $U_{j'}$ when all data $FL_1, FL_2, \ldots,$ and $FL_r$ corresponding to data $a_1, a_2, \ldots,$ and $a_r$ represent an inactive state;

and wherein such lth operating unit outputs $a_s \oplus a_{s+1} \oplus a_{s+2} \oplus \ldots \oplus a_r$ (where s is a maximum value of an affix data FL representing an active state) as signals $DA_{j'}$ and $DB_{j'}$ and makes said $a_s \oplus a_{s+1} \oplus a_{s+2} \oplus \ldots \oplus a_r$ an operation result, when at least one of the data $FL_1, FL_2, \ldots,$ and $FL_r$ represents the active state.

* * * * *